US011397368B1

(12) United States Patent
Lu et al.

(10) Patent No.: US 11,397,368 B1
(45) Date of Patent: *Jul. 26, 2022

(54) ULTRA-WIDE FIELD-OF-VIEW SCANNING DEVICES FOR DEPTH SENSING

(71) Applicant: Facebook Technologies, LLC, Menlo Park, CA (US)

(72) Inventors: Lu Lu, Seattle, WA (US); Qing Chao, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/797,679

(22) Filed: Feb. 21, 2020

Related U.S. Application Data

(63) Continuation of application No. 15/960,045, filed on Apr. 23, 2018, now Pat. No. 10,613,413.

(Continued)

(51) Int. Cl.
G02F 1/33 (2006.01)
G06T 7/50 (2017.01)
(Continued)

(52) U.S. Cl.
CPC ............. G02F 1/33 (2013.01); G02B 26/106 (2013.01); G06T 7/50 (2017.01); G02B 2027/0123 (2013.01)

(58) Field of Classification Search
CPC . G02F 1/33; G02B 2027/0123; G02B 26/106; G06T 7/50
See application file for complete search history.

(56) References Cited

U.S. PATENT DOCUMENTS 4,770,530 A 9/1988 Van Aken et al.
6,052,189 A 4/2000 Fuse et al.
(Continued)

FOREIGN PATENT DOCUMENTS

CN 103053167 A 4/2013
CN 205157881 U 4/2016
(Continued)

OTHER PUBLICATIONS

English Translation of CN205157881 cited in Jun. 21, 2021 IDS relied upon for Examination. (Year: 2016).

(Continued)

Primary Examiner — Deoram Persaud
(74) Attorney, Agent, or Firm — Fenwick & West LLP

(57) ABSTRACT

A depth camera assembly for determining depth information for objects in a local area comprises a light generator, a camera and a controller. The light generator illuminates the local area with structured light in accordance with emission instructions from the controller. The light generator includes an illumination source, an acousto-optic deflector (AOD), and a liquid crystal device (LCD) with liquid crystal gratings (LCGs). The AOD functions as a dynamic diffraction grating that diffracts optical beams emitted from the illumination source to form diffracted scanning beams, based on emission instructions from the controller. Each LCG in the LCD is configured to further diffract light from the AOD to generate the structured light projected into the local area. The camera captures images of portions of the structured light reflected from objects in the local area. The controller determines depth information for the objects based on the captured images.

20 Claims, 9 Drawing Sheets

Related U.S. Application Data

(60) Provisional application No. 62/513,286, filed on May 31, 2017.

(51) Int. Cl.
*G02B 26/10* (2006.01)
*G02B 27/01* (2006.01)

(56) References Cited

U.S. PATENT DOCUMENTS

| | | |
|---|---|---|
| 6,208,466 B1 | 3/2001 | Liu et al. |
| 8,320,621 B2 | 11/2012 | McEldowney |
| 9,294,758 B2 | 3/2016 | Xiong et al. |
| 9,804,397 B2 | 10/2017 | Schowengerdt et al. |
| 9,946,071 B2 | 4/2018 | Schowengerdt |
| 10,027,386 B2 | 7/2018 | Kohli |
| 10,158,845 B2 | 12/2018 | Zhu et al. |
| 10,168,454 B2 | 1/2019 | Sugihara et al. |
| 10,181,200 B1 | 1/2019 | Chao et al. |
| 10,388,026 B1 | 8/2019 | Chao et al. |
| 10,410,373 B1 | 9/2019 | Hall et al. |
| 10,412,371 B1 | 9/2019 | Chao et al. |
| 10,473,935 B1 | 11/2019 | Gribeiz et al. |
| 10,503,265 B2 | 12/2019 | Viswanathan |
| 10,574,973 B2 | 2/2020 | Hall et al. |
| 10,613,413 B1 | 4/2020 | Lu et al. |
| 10,740,915 B1 | 8/2020 | Chao et al. |
| 2003/0012657 A1 | 1/2003 | Marr et al. |
| 2004/0108971 A1 | 6/2004 | Waldern et al. |
| 2004/0233408 A1 | 11/2004 | Sievers |
| 2005/0122549 A1 | 6/2005 | Goulanian et al. |
| 2005/0174470 A1 | 8/2005 | Yamasaki |
| 2006/0028400 A1 | 2/2006 | Lapstun et al. |
| 2008/0236275 A1 | 10/2008 | Breed et al. |
| 2008/0246952 A1 | 10/2008 | Rich et al. |
| 2009/0316141 A1 | 12/2009 | Feldkhun |
| 2010/0091203 A1 | 4/2010 | Kobayashi et al. |
| 2010/0176102 A1 | 7/2010 | Petring et al. |
| 2010/0301023 A1 | 12/2010 | Unrath et al. |
| 2010/0304854 A1 | 12/2010 | McEldowney |
| 2011/0063705 A1 | 3/2011 | Tsukamoto et al. |
| 2011/0242298 A1 | 10/2011 | Bathiche et al. |
| 2011/0298918 A1 | 12/2011 | McEldowney |
| 2013/0343705 A1 | 12/2013 | Vermeulen et al. |
| 2014/0035959 A1 | 2/2014 | Lapstun |
| 2014/0071456 A1 | 3/2014 | Podoleanu et al. |
| 2014/0192214 A1 | 7/2014 | Laroia |
| 2014/0293011 A1 | 10/2014 | Lohry et al. |
| 2014/0293737 A1 | 10/2014 | Sangawa et al. |
| 2015/0234477 A1 | 8/2015 | Abovitz et al. |
| 2015/0241705 A1 | 8/2015 | Abovitz et al. |
| 2015/0301338 A1 | 10/2015 | Van Heugten |
| 2015/0338718 A1 | 11/2015 | Zhang et al. |
| 2016/0012170 A1 | 1/2016 | Platzgummer |
| 2016/0026253 A1 | 1/2016 | Bradski et al. |
| 2016/0043350 A1 | 2/2016 | Cho et al. |
| 2016/0077338 A1 | 3/2016 | Robbins et al. |
| 2016/0097930 A1 | 4/2016 | Robbins et al. |
| 2016/0135688 A1 | 5/2016 | Ebisawa |
| 2016/0139402 A1 | 5/2016 | Lapstun |
| 2016/0198147 A1 | 7/2016 | Waligorski et al. |
| 2016/0249982 A1 | 9/2016 | Varghese et al. |
| 2016/0286202 A1 | 9/2016 | Romano et al. |
| 2016/0295201 A1 | 10/2016 | So et al. |
| 2016/0313244 A1 | 10/2016 | Shiono |
| 2017/0059960 A1 | 3/2017 | Shi et al. |
| 2017/0084044 A1 | 3/2017 | Keh et al. |
| 2017/0122728 A1 | 5/2017 | Kipfer et al. |
| 2017/0176575 A1 | 6/2017 | Smits |
| 2017/0195653 A1 | 7/2017 | Trail et al. |
| 2017/0214907 A1 | 7/2017 | Lapstun |
| 2017/0270637 A1 | 9/2017 | Perreault et al. |
| 2017/0301736 A1 | 10/2017 | Wang et al. |
| 2017/0322424 A1* | 11/2017 | Rossi ............... G02B 27/0037 |
| 2017/0328826 A1* | 11/2017 | Diebold ............... G01N 15/147 |
| 2017/0332071 A1 | 11/2017 | Ledentsov et al. |
| 2017/0350575 A1 | 12/2017 | Hill et al. |
| 2018/0061034 A1 | 3/2018 | Zhao et al. |
| 2018/0084245 A1 | 3/2018 | Lapstun |
| 2018/0131929 A1 | 5/2018 | Lee et al. |
| 2018/0143438 A1 | 5/2018 | Oh |
| 2018/0204340 A1 | 7/2018 | Zhao et al. |
| 2018/0227567 A1 | 8/2018 | Chao et al. |
| 2018/0232048 A1 | 8/2018 | Popovich et al. |
| 2018/0275409 A1* | 9/2018 | Gao ............... H04N 13/344 |
| 2018/0275410 A1 | 9/2018 | Yeoh et al. |
| 2019/0008388 A1 | 1/2019 | Ando et al. |
| 2019/0066316 A1 | 2/2019 | Bardagjy et al. |
| 2019/0075281 A1 | 3/2019 | Hall et al. |
| 2019/0086674 A1 | 3/2019 | Sinay et al. |
| 2019/0273114 A1 | 9/2019 | Liu |

FOREIGN PATENT DOCUMENTS

| | | |
|---|---|---|
| CN | 107250882 A | 10/2017 |
| CN | 107850780 A | 3/2018 |
| CN | 108027881 A | 5/2018 |
| CN | 108353115 A | 7/2018 |
| EP | 0903609 A1 | 3/1999 |

OTHER PUBLICATIONS

Cheng, H. H. et al., "Concept for a Transmissive, Large Angle, Light Steering Device with High Efficiency," Optics Letters, May 1, 2015, pp. 2080-2083, vol. 40, No. 9.

Cheng, H.H. et al., "Large Angle Image Steering Using a Liquid Crystal Device," SID International Symposium Digest of Technical Papers, Jun. 2014, pp. 739-742, vol. XLV, Book II.

Provenzano, C. et al., "Electrically Tunable Two-Dimensional Liquid Crystals Gratings Induced by Polarization Holography," Optics Express, Apr. 30, 2007, pp. 5872-5878, vol. 15, No. 9.

"Principle of Depth Sensors," Media Research Lab, Undated, 4 pages, May be Retrieved at <URL: http://homel.vsb.cz/~fus032/ano2/hct.pdf>.

"Time of Flight Sensors | Overview | Sensors | TI.com," Texas Instruments Incorporated, 1995-2018, 2 pages, [Online] [Retrieved on Jun. 28, 2018] Retrieved from the Internet<URL http://www.ti.com/lsds/ti/sensing-products/optical-sensors/3d-time-of-flight-sensors-technology-comparison.page>.

United States Office Action, U.S. Appl. No. 15/428,780, filed Nov. 20, 2020, eight pages.

United States Office Action, U.S. Appl. No. 15/428,780, filed Sep. 24, 2020, 15 pages.

Final Office Action dated Oct. 7, 2021 for U.S. Appl. No. 16/738,478, filed Jan. 9, 2020, 27 pages.

"3D Time of Flight (ToF) Sensors—Technology Comparison," Texas Instruments Incorporated, 1995-2017, 2 pages.

Final Office Action dated Feb. 19, 2021 for U.S. Appl. No. 16/917,705, filed Jun. 30, 2020, 6 pages.

Final Office Action dated Feb. 28, 2019 for U.S. Appl. No. 15/643,912, filed Jul. 7, 2017, 6 pages.

Final Office Action dated Jun. 23, 2021 for U.S. Appl. No. 16/738,478, filed Jan. 9, 2020, 39 pages.

Non-Final Office Action dated Apr. 9, 2021 for U.S. Appl. No. 16/738,478, filed Jan. 9, 2020, 35 pages.

Non-Final Office Action dated Dec. 26, 2018 for U.S. Appl. No. 15/643,912, filed Jul. 7, 2017, 6 pages.

Non-Final Office Action dated Jan. 26, 2021 for U.S. Appl. No. 16/917,705, filed Jun. 30, 2020, 13 pages.

Office Action dated May 14, 2021 for Chinese Application No. 201811031191.2, filed Sep. 5, 2018, 17 pages.

Office Action dated Sep. 28, 2020 for Chinese Application No. 2018110311912, filed Sep. 5, 2018, 10 pages.

Non-Final Office Action dated Aug. 27, 2021 for U.S. Appl. No. 16/738,478, filed Jan. 9, 2020, 39 pages.

* cited by examiner

ULTRA-WIDE FIELD-OF-VIEW SCANNING DEVICES FOR DEPTH SENSING

CROSS-REFERENCE TO RELATED APPLICATIONS

This application is a continuation of U.S. patent application Ser. No. 15/960,045, filed Apr. 23, 2018, which claims benefit of U.S. Provisional Patent Application Ser. No. 62/513,286, filed May 31, 2017, which is hereby incorporated by reference in its entirety.

BACKGROUND

The present disclosure generally relates to depth sensing, and specifically relates to ultra-wide field-of-view scanning devices for three-dimensional (3D) depth sensing.

To achieve a compelling user experience for depth sensing when using head-mounted displays (HMDs) and near-eye displays (NEDs), it is important to create a dynamic and all solid-state light scanning device with both ultrafast scanning speed (e.g., MHz) and large field-of-view. Usually, there are tradeoffs between speed, field-of-view and real-time reconfigurable illumination characteristics. Typically, a microelectromechanical system (MEM) having a mechanical-based mirror device can be used for scanning. However, the mechanical-based mirror device has stability issues and has a limited scanning speed. In addition, the mechanical-based mirror device is not reconfigurable in real time applications.

Most depth sensing methods rely on active illumination and detection. The conventional methods for depth sensing involve mechanical scanning or fixed diffractive-optics pattern projection, using structured light or time-of-flight techniques. Depth sensing based on time-of-flight uses a MEM with a mechanical-based mirror device (scanner) to send short pulses into an object space. The depth sensing based on time-of-flight further uses a high speed detector to time-gate back scattered light from the object to create high resolution depth maps. However, the mechanical-based scanner performs inadequately in relation to scanning speed, real-time reconfiguration and mechanical stability. The scanning speed is often limited to a few kHz along a fast axis and a few hundred Hertz along a slow axis. In addition, the mechanical-based scanner has stability and reliability issues. Depth sensing based on a fixed structured light pattern uses a diffractive optical element to generate a fixed structured light pattern projected into an object space. The depth sensing based on the fixed structured light pattern further uses a pre-stored look-up table to compute and extract depth maps. However, the depth sensing based on the fixed structured light pattern and the diffractive optical element is not robust enough for dynamic depth sensing.

SUMMARY

A depth camera assembly (DCA) determines depth information associated with one or more objects in a local area. The DCA comprises a light generator, an imaging device and a controller. The light generator is configured to illuminate the local area with structured light in accordance with emission instructions. The light generator comprises an illumination source, an acousto-optic deflector (AOD), a liquid crystal device (LCD), and a projection assembly. The illumination source is configured to emit one or more optical beams. The AOD generates diffracted scanning beams (in one or two dimensions) from the one or more optical beams emitted from the illumination source. The AOD is configured to function as at least one dynamic diffraction grating that diffracts the one or more optical beams by at least one diffraction angle to form the diffracted scanning beams based in part on the emission instructions. The LCD includes a plurality of liquid crystal gratings (LCGs). Each LCG in the LCD has an active state in which the LCG is configured to diffract the diffracted scanning beams by another diffraction angle larger than the at least one diffraction angle based in part on the emission instructions to generate the structured light. The projection assembly is configured to project the structured light into the local area. The imaging device is configured to capture one or more images of portions of the structured light reflected from one or more objects in the local area. The controller may be coupled to both the light generator and the imaging device. The controller generates the emission instructions and provides the emission instructions to the light generator. The controller is also configured to determine depth information for the one or more objects based at least in part on the captured one or more images.

An eyeglass-type platform representing a near-eye display (NED) can integrate the DCA. The NED further includes an electronic display and an optical assembly. The NED may be part of an artificial reality system. The electronic display of the NED is configured to emit image light. The optical assembly of the NED is configured to direct the image light to an eye-box of the NED corresponding to a location of a user's eye. The image light may comprise the depth information of the one or more objects in the local area determined by the DCA.

A head-mounted display (HMD) can further integrate the DCA. The HMD further includes an electronic display and an optical assembly. The HMD may be part of an artificial reality system. The electronic display is configured to emit image light. The optical assembly is configured to direct the image light to an eye-box of the HMD corresponding to a location of a user's eye. The image light may comprise the depth information of the one or more objects in the local area determined by the DCA.

Figure 1A:
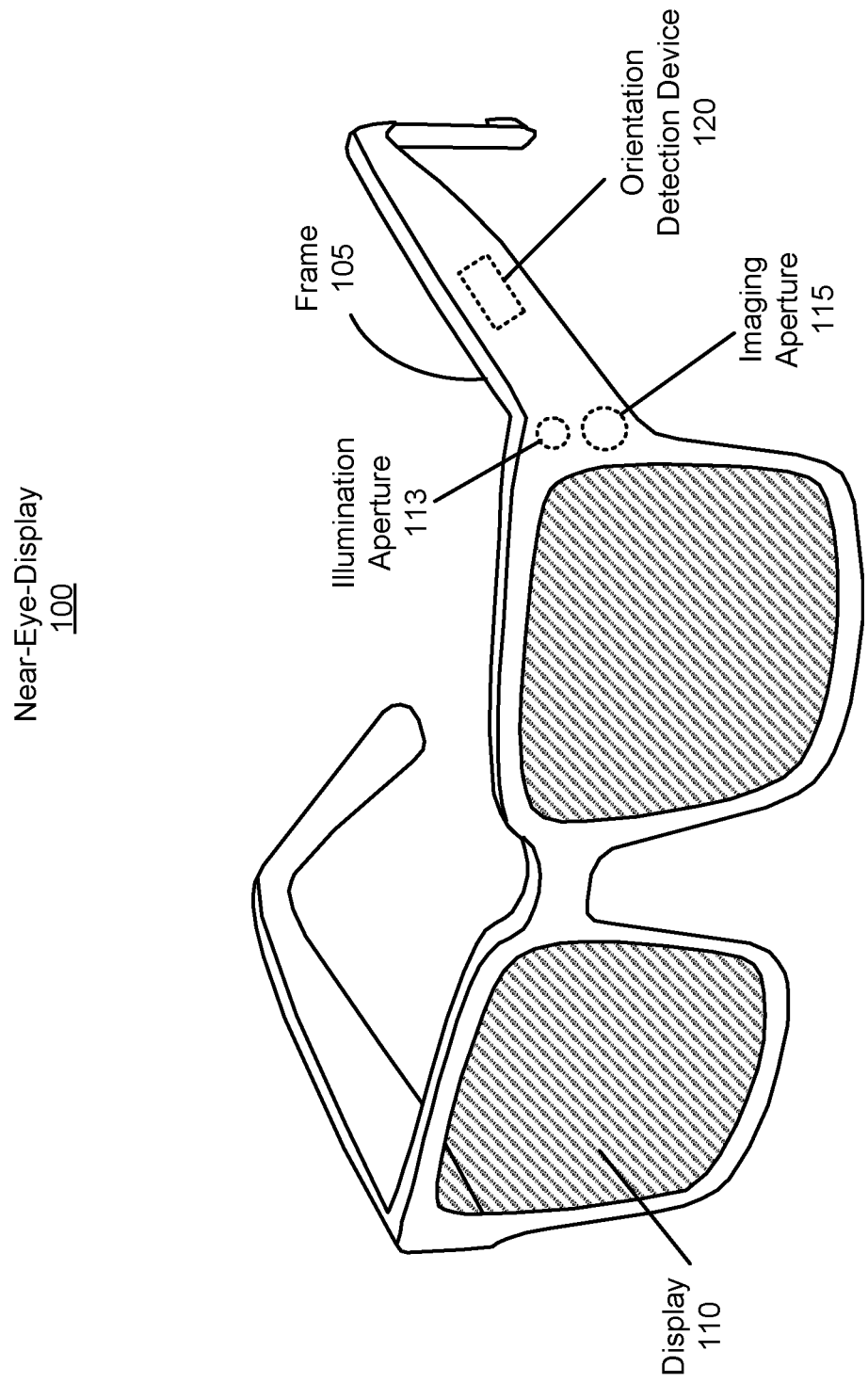
FIG. 1A is a diagram of a near-eye-display (NED), in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a near-eye display (NED), a mobile device or computing system, or any other hardware platform capable of providing artificial reality content to one or more viewers.

A depth camera assembly (DCA) for determining depth information of objects in a local area surrounding some or all of the DCA is presented herein. The DCA includes a light source, one or more cameras and a controller. The light source includes a laser source and an acousto-optic deflector (AOD) that generates structured light using light emitted from the laser source. The AOD can be composed of one or more acousto-optic devices or plates. Each acousto-optic plate can be configured to diffract incident light by a specific diffraction angle controlled by, e.g., an electric field applied to the acousto-optic plate. The light source also includes a plurality of active liquid crystal gratings (LCGs). Adjustments to settings of the plurality of LCGs determine where the structured light is projected into the local area. The one or more cameras capture one or more images of portions of the structured light reflected from the objects in the local area. Note that the portions of the structured light can be also scattered from one or more objects in the local area, wherein scattering represents a form of diffuse reflection. The controller determines depth information based on the captured one or more images.

In some embodiments, the DCA is integrated into a NED that captures data describing depth information in a local area surrounding some or all of the NED. The NED further includes an electronic display and an optical assembly. The NED may be part of an artificial reality system, e.g., an AR system and/or VR system. The electronic display of the NED is configured to emit image light. The optical assembly of the NED is configured to direct the image light to an eye-box of the NED corresponding to a location of a user's eye, the image light comprising the depth information of the objects in the local area determined by the DCA.

In some embodiments, the DCA is integrated into a HMD that captures data describing depth information in a local area surrounding some or all of the HMD. The HMD may be part of an artificial reality system. The HMD further includes an electronic display and an optical assembly. The electronic display is configured to emit image light. The optical assembly is configured to direct the image light to an eye-box of the HMD corresponding to a location of a user's eye, the image light comprising the depth information of the objects in the local area determined by the DCA.

FIG. 1A is a diagram of a NED 100, in accordance with one or more embodiments. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 may be part of an artificial reality system (not shown). The NED 100 is generally configured to operate as an artificial reality NED. In some embodiments, the NED 100 may augment views of a physical, real-world environment with computer-generated elements (e.g., images, video, sound, etc.).

The NED 100 shown in FIG. 1A includes a frame 105 and a display 110. The frame 105 includes one or more optical elements which together display media to users. The display 110 is configured for users to see the content presented by the NED 100. The display 110 generates an image light to present media to an eye of the user. The NED 100 also includes a DCA (not shown in FIG. 1A) configured to determine depth information of a local area surrounding some or all of the NED 100. The NED 100 also includes an illumination aperture 113, and an illumination source of the DCA emits light (e.g., structured light) through the illumination aperture 113. An imaging device of the DCA captures light from the illumination source that is reflected from the local area, e.g., through the imaging aperture 115. Light emitted from the illumination source of the DCA through the illumination aperture 113 comprises structured light, as discussed in more detail in conjunction with FIG. 3A. Light reflected from the local area through the imaging aperture 115 and captured by the imaging device of the DCA comprises portions of the reflected structured light. The NED 100 may also include an orientation detection device 120 that generates one or more measurement signals in response to motion of the NED 100 and generates information about orientation of the NED 100. Examples of the orientation detection device 120 include: one or more accelerometers, one or more gyroscopes, one or more magnetometers, another suitable type of sensor that detects motion, or some combination thereof.

Figure 1B:
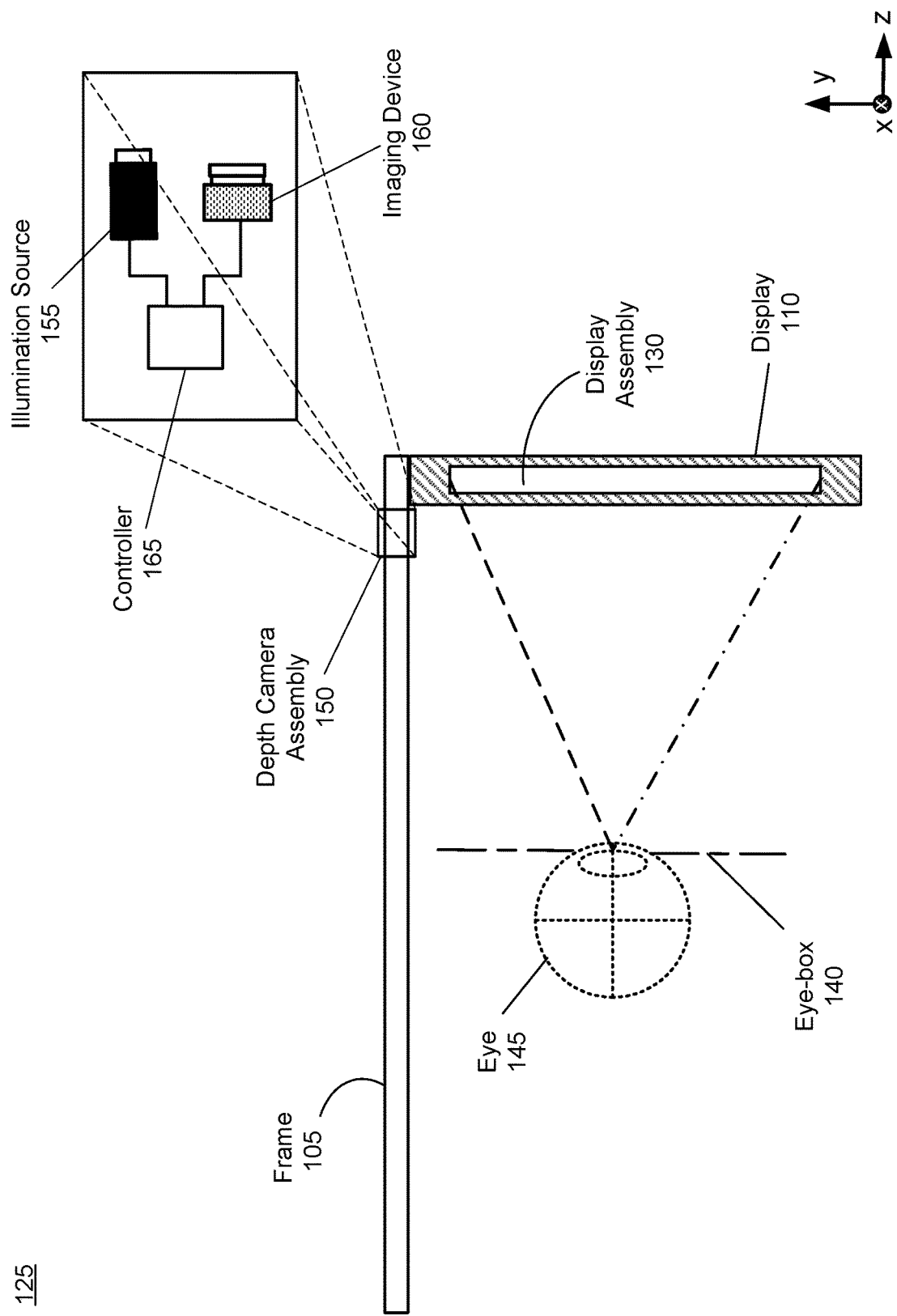
FIG. 1B is a cross-section of an eyewear of the NED in FIG. 1A, in accordance with one or more embodiments.

FIG. 1B is a cross section 125 of an eyewear of the NED 100 illustrated in FIG. 1A, in accordance with one or more embodiments. The cross section 125 includes at least one display assembly 130 integrated into the display 110, an eye-box 140, and a DCA 150. The eye-box 140 is a location where an eye 145 is positioned when a user wears the NED 100. In some embodiments, the frame 105 may represent a frame of eye-wear glasses. For purposes of illustration, FIG. 1B shows the cross section 125 associated with a single eye 145 and a single display assembly 130, but in alternative embodiments not shown, another display assembly which is separate from the display assembly 130 shown in FIG. 1B, provides image light to another eye 145 of the user.

The display assembly 130 is configured to direct the image light to the eye 145 through the eye-box 140. In some embodiments, when the NED 100 is configured as an AR NED, the display assembly 130 also directs light from a local area surrounding the NED 100 to the eye 145 through the eye-box 140. The display assembly 130 may be configured to emit image light at a particular focal distance in accordance with varifocal instructions, e.g., provided from a varifocal module (not shown in FIG. 1B).

The display assembly 130 may be composed of one or more materials (e.g., plastic, glass, etc.) with one or more refractive indices that effectively minimize the weight and present to the user a field of view of the NED 100. In alternate configurations, the NED 100 includes an optical assembly with one or more optical elements between the display assembly 130 and the eye 145. The optical elements may act to, e.g., correct aberrations in image light emitted from the display assembly 130, magnify image light, perform some other optical adjustment of image light emitted from the display assembly 130, or some combination thereof. The example for optical elements may include an aperture, a Fresnel lens, a convex lens, a concave lens, a liquid crystal lens, a diffractive element, a waveguide, a filter, a polarizer, a diffuser, a fiber taper, one or more reflective surfaces, a polarizing reflective surface, a birefringent element, or any other suitable optical element that affects image light emitted from the display assembly 130.

The frame 105 further includes a DCA 150 configured to determine depth information of one or more objects in a local area surrounding some or all of the NED 100. The DCA 150 includes an illumination source 155, an imaging device 160, and a controller 165 that may be coupled to at least one of the illumination source 155 and the imaging device 160. In some embodiments (now shown in FIG. 1B), the illumination source 155 and the imaging device 160 each may include its own internal controller. In some embodiments (not shown in FIG. 1B), the illumination source 155 and the imaging device 160 can be widely separated, e.g., the illumination source 155 and the imaging device 160 can be located in different assemblies.

The illumination source 155 may be configured to illuminate the local area with structured light through the illumination aperture 113 in accordance with emission instructions generated by the controller 165. The illumination source 155 may include a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source.

The imaging device 160 includes one or more cameras configured to capture, through the imaging aperture 115, one or more images of at least a portion of the structured light reflected from one or more objects in the local area. In one embodiment, the imaging device 160 is an infrared camera configured to capture images in the infrared spectrum. Additionally or alternatively, the imaging device 160 may be also configured to capture images of visible spectrum light. The imaging device 160 may include a charge-coupled device (CCD) detector, a complementary metal-oxide-semiconductor (CMOS) detector or some other types of detectors (not shown in FIG. 1B). The imaging device 160 may be configured to operate with a pre-determined frame rate for fast detection of objects in the local area.

The controller 165 may generate the emission instructions and provide the emission instructions to the illumination source 155 for controlling operation of the illumination source 155. The controller 165 may control, based on the emission instructions, operation of the illumination source 155 to dynamically adjust a pattern of the structured light illuminating the local area, an intensity of the light pattern, a density of the light pattern, location of the light being projected at the local area, etc. The controller 165 may be also configured to determine depth information for the one or more objects in the local area based in part on the one or more images captured by the imaging device 160. In some embodiments, the controller 165 provides the determined depth information to a console (not shown in FIG. 1B) and/or an appropriate module of the NED 100 (e.g., a varifocal module, not shown in FIG. 1B). The console and/or the NED 100 may utilize the depth information to, e.g., generate content for presentation on the display 110. More details about the structure and operation of the DCA 150 are disclosed in conjunction with FIGS. 3A-3C and FIG. 4.

Figure 2A:
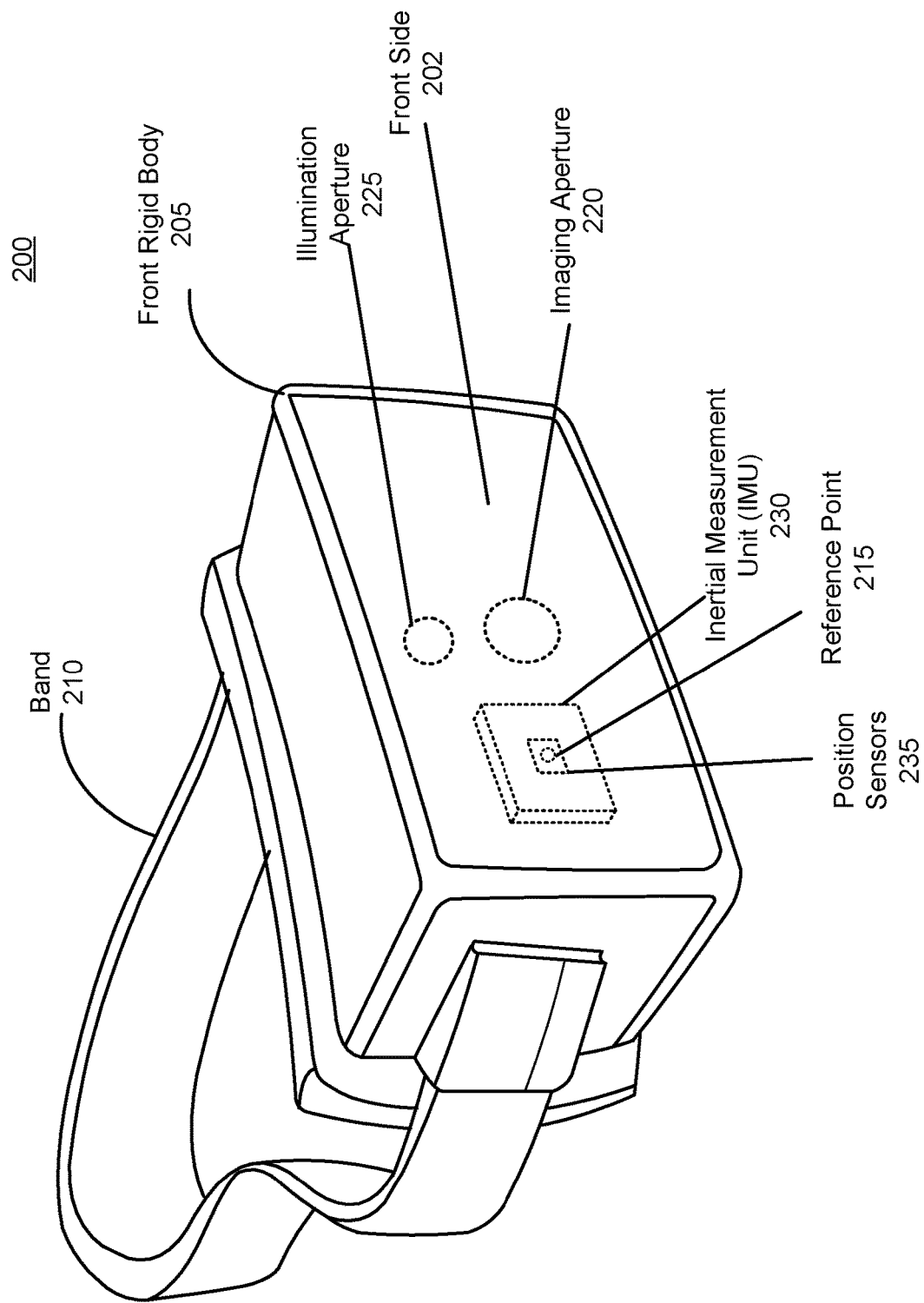
FIG. 2A is a diagram of a head-mounted display (HMD), in accordance with one or more embodiments.

FIG. 2A is a diagram of a HMD 200, in accordance with one or more embodiments. The HMD 200 may be part of an artificial reality system. In embodiments that describe AR system and/or a MR system, portions of a front side 202 of the HMD 200 are at least partially transparent in the visible band (~380 nm to 750 nm), and portions of the HMD 200 that are between the front side 202 of the HMD 200 and an eye of the user are at least partially transparent (e.g., a partially transparent electronic display). The HMD 200 includes a front rigid body 205, a band 210, and a reference point 215. The HMD 200 also includes a DCA configured to determine depth information of a local area surrounding some or all of the HMD 200. The HMD 200 also includes an imaging aperture 220 and an illumination aperture 225, and an illumination source of the DCA emits light (e.g., structured light) through the illumination aperture 225. An imaging device of the DCA captures light from the illumination source that is reflected from the local area through the imaging aperture 220. Light emitted from the illumination source of the DCA through the illumination aperture 225 comprises structured light, as discussed in more detail in conjunction with FIG. 3A and FIG. 4. Light reflected from the local area through the imaging aperture 220 and captured by the imaging device of the DCA comprises portions of the reflected structured light.

The front rigid body 205 includes one or more electronic display elements (not shown in FIG. 2A), one or more integrated eye tracking systems (not shown in FIG. 2A), an Inertial Measurement Unit (IMU) 230, one or more position sensors 235, and the reference point 215. In the embodiment shown by FIG. 2A, the position sensors 235 are located within the IMU 230, and neither the IMU 230 nor the position sensors 235 are visible to a user of the HMD 200. The IMU 230 is an electronic device that generates fast calibration data based on measurement signals received from one or more of the position sensors 235. A position sensor 235 generates one or more measurement signals in response to motion of the HMD 200. Examples of position sensors 235 include: one or more accelerometers, one or more gyroscopes, one or more magnetometers, another suitable type of sensor that detects motion, a type of sensor used for error correction of the IMU 230, or some combination thereof. The position sensors 235 may be located external to the IMU 230, internal to the IMU 230, or some combination thereof.

Figure 2B:
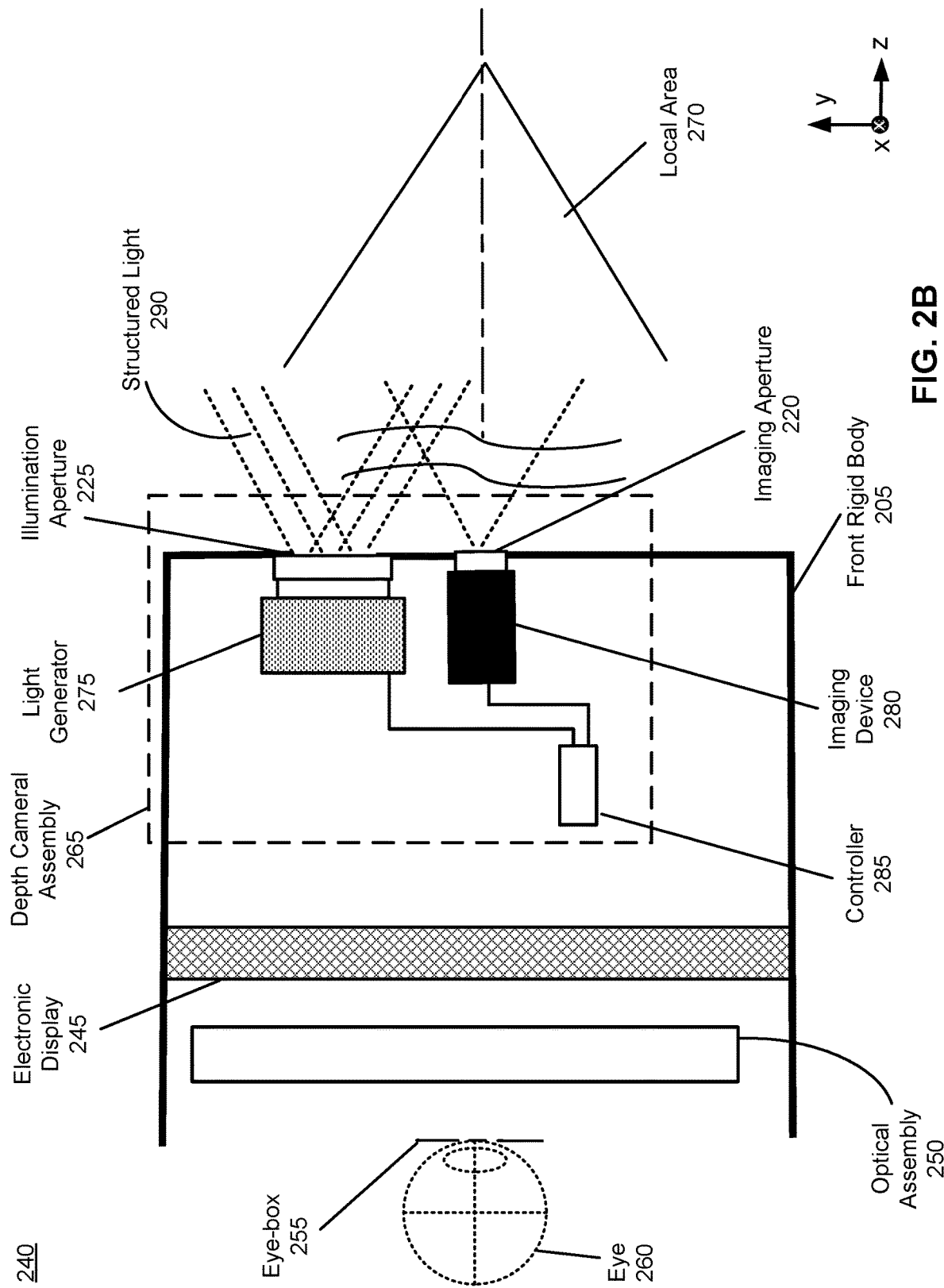
FIG. 2B is a cross section of a front rigid body of the HMD in FIG. 2A, in accordance with one or more embodiments.

FIG. 2B is a cross section 240 of the front rigid body 205 of the HMD 200 shown in FIG. 2A. As shown in FIG. 2B, the front rigid body 205 includes an electronic display 245 and an optical assembly 250 that together provide image light to an eye-box 255. The eye-box 255 is the location of the front rigid body 205 where a user's eye 260 is positioned. For purposes of illustration, FIG. 2B shows a cross section 240 associated with a single eye 260, but another optical assembly 250, separate from the optical assembly 250, provides altered image light to another eye of the user. The front rigid body 205 also has an optical axis corresponding to a path along which image light propagates through the front rigid body 205.

The electronic display 245 generates image light. In some embodiments, the electronic display 245 includes an optical element that adjusts the focus of the generated image light. The electronic display 245 displays images to the user in accordance with data received from a console (not shown in FIG. 2B). In various embodiments, the electronic display 245 may comprise a single electronic display or multiple electronic displays (e.g., a display for each eye of a user). Examples of the electronic display 245 include: a liquid crystal display, an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 245 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optical assembly 250 magnifies received light from the electronic display 245, corrects optical aberrations associated with the image light, and the corrected image light is presented to a user of the HMD 200. At least one optical element of the optical assembly 250 may be an aperture, a Fresnel lens, a refractive lens, a reflective surface, a diffractive element, a waveguide, a filter, or any other suitable optical element that affects the image light emitted from the electronic display 245. Moreover, the optical assembly 250 may include combinations of different optical elements. In some embodiments, one or more of the optical elements in the optical assembly 250 may have one or more coatings, such as anti-reflective coatings, dichroic coatings, etc. Magnification of the image light by the optical assembly 250 allows elements of the electronic display 245 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the user's field-of-view. In some embodiments, the optical assembly 250 is designed so its effective focal length is larger than the spacing to the electronic display 245, which magnifies the image light projected by the electronic display 245. Additionally, in some embodiments, the amount of magnification may be adjusted by adding or removing optical elements.

As shown in FIG. 2B, the front rigid body 205 further includes a DCA 265 for determining depth information of one or more objects in a local area 270 surrounding some or all of the HMD 200. The DCA 265 includes a light generator 275, an imaging device 280, and a controller 285 that may be coupled to both the light generator 275 and the imaging device 280. The light generator 275 emits light through the illumination aperture 225. In accordance with embodiments of the present disclosure, the light generator 275 is configured to illuminate the local area 270 with structured light 290 in accordance with emission instructions generated by the controller 285. The controller 285 is configured to control operation of certain components of the light generator 275, based on the emission instructions. The controller 285 provides the emission instructions to a plurality of diffractive optical elements of the light generator 275 to control a field-of-view of the local area 270 illuminated by the structured light 290. More details about controlling the plurality of diffractive optical elements of the light generator 275 by the controller 285 are disclosed in conjunction with FIGS. 3A-3C and FIG. 4.

The light generator 275 may include a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the light generator 275 can emit light having a structured light pattern. More details about the DCA 265 that includes the light generator 275 are disclosed in conjunction with FIG. 3A.

The imaging device 280 includes one or more cameras configured to capture, through the imaging aperture 220, portions of the structured light 290 reflected from the local area 270. The imaging device 280 captures one or more images of one or more objects in the local area 270 illuminated with the structured light 290. The controller 285 is also configured to determine depth information for the one or more objects based on the captured portions of the reflected structured light. In some embodiments, the controller 285 provides the determined depth information to a console (not shown in FIG. 2B) and/or an appropriate module of the HMD 200 (e.g., a varifocal module, not shown in FIG. 2B). The console and/or the HMD 200 may utilize the depth information to, e.g., generate content for presentation on the electronic display 245.

In some embodiments, the front rigid body 205 further comprises an eye tracking system (not shown in FIG. 2B) that determines eye tracking information for the user's eye 260. The determined eye tracking information may comprise information about an orientation of the user's eye 260 in the eye-box 255, i.e., information about an angle of an eye-gaze. The eye-box 255 represents a three-dimensional volume at an output of a HMD in which the user's eye is located to receive image light. In one embodiment, the user's eye 260 is illuminated with a structured light. Then, the eye tracking system can use locations of the reflected structured light in a captured image to determine eye position and eye-gaze. In another embodiment, the eye tracking system determines eye position and eye-gaze based on magnitudes of image light captured over a plurality of time instants.

In some embodiments, the front rigid body 205 further comprises a varifocal module (not shown in FIG. 2B). The varifocal module may adjust focus of one or more images displayed on the electronic display 245, based on the eye tracking information. In one embodiment, the varifocal module adjusts focus of the displayed images and mitigates vergence-accommodation conflict by adjusting a focal distance of the optical assembly 250 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 285 to generate content for presentation on the electronic display 245.

Figure 3A:
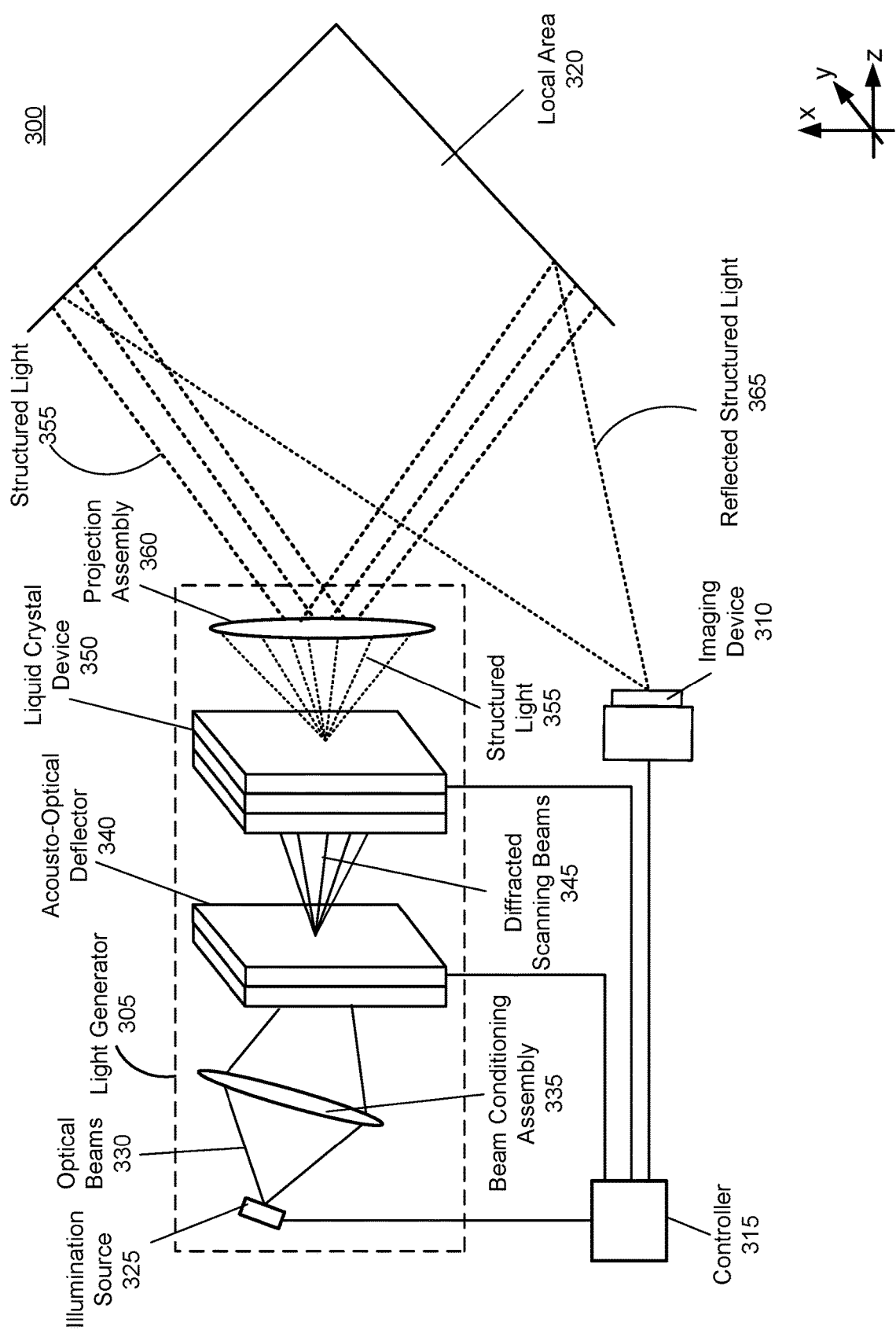
FIG. 3A is an example depth camera assembly (DCA), in accordance with one or more embodiments.

FIG. 3A is an example DCA 300 configured for depth sensing based on structured light with an ultra-wide field-of-view, in accordance with one or more embodiments. The DCA 300 includes a light generator 305, an imaging device 310, and a controller 315 coupled to both the light generator 305 and the imaging device 310. The DCA 300 may be configured to be a component of the NED 100 in FIG. 1A and/or a component of the HMD 200 in FIG. 2A. Thus, the DCA 300 may be an embodiment of the DCA 150 in FIG. 1B and/or an embodiment of the DCA 265 in FIG. 2B; the light generator 305 may be an embodiment of the illumination source 155 in FIG. 1B and/or an embodiment of the light generator 275 in FIG. 2B; and the imaging device 310 may be an embodiment of the imaging device 160 in FIG. 1B and/or an embodiment of the imaging device 280 in FIG. 2B.

The light generator 305 is configured to illuminate and scan a local area 320 with structured light in accordance with emission instructions from the controller 315. The light generator 305 includes an illumination source 325 (e.g., laser diode) configured to emit one or more optical beams 330. The illumination source 325 may directly generate the one or more optical beams 330 as polarized light. The one or more optical beams 330 can be circularly polarized (right handed or in other embodiments left handed). In alternate embodiments, the one or more optical beams 330 can be linearly polarized (vertical and horizontal), or elliptically polarized (right or left). Alternatively, the illumination source 325 may emit unpolarized light, and a polarizing element (not shown in FIG. 3A) separate from the illumination source 325 may generate the one or more optical beams 330 as polarized light, based in part on the emission instructions from the controller 315. The polarizing element may be integrated into the illumination source 325 or placed in front of the illumination source 325. In some embodiments, for depth sensing based on time-of-flight, the one or more optical beams 330 are temporally modulated for generating temporally modulated illumination of the local area 320.

A beam conditioning assembly 335 collects light emitted from the illumination source 325 and directs the collected light toward a portion of an AOD 340. The beam conditioning assembly 335 may be composed of one or more optical elements, e.g., lenses having specific optical powers.

The AOD 340 diffracts light into one or more dimensions. The AOD 340 is composed of one or more acousto-optic devices or plates that generate diffracted scanning beams 345 in one or two dimensions by diffracting the one or more optical beams 330. In some embodiments, the diffracted scanning beams 345 represent structured light of a defined pattern, e.g., a pattern of light having parallel stripes, a dot pattern, etc. In some embodiments, the AOD 340 is configured to function as at least one dynamic diffraction grating that diffracts the one or more optical beams 330 to form the diffracted scanning beams 345 based in part on emission instructions from the controller 315. Each acousto-optic device in the AOD 340 may include a transducer or an array of transducers and one or more diffraction areas (not shown in FIG. 3A). Responsive to at least one radio frequency in the emission instructions, the transducer or the array of transducers of the acousto-optic device in the AOD 340 may be configured to generate at least one sound wave in the one or more diffraction areas of the acousto-optic device to form the at least one dynamic diffraction grating.

The AOD 340 can be configured to actively scan a plurality of diffraction angles at which the one or more optical beams 330 are diffracted and interfered to form the diffracted scanning beams 345. The AOD 340 is configured to scan the plurality of diffraction angles between, e.g., −5 degrees and +5 degrees. In this way, the diffracted scanning beams 345 formed by the AOD 340 covers a scanning zone with a field-of-view of, e.g., 10 degrees, along one or two dimensions. In some embodiments, the AOD 340 is configured to scan the plurality of diffraction angles with the scanning resolution of 0.1 degree, thus supporting a fine-grained scanning. Due to a relatively narrow scanning zone, the AOD 340 can support fast scanning with scanning speeds, e.g., in the order of MHz.

The AOD 340 can be used to scan the local area 320 at discrete angles or a continuum of angles, depending on a radio frequency signal that drives the AOD 340, controlled by, e.g., the controller 315. In some embodiments, to achieve scanning of discrete angles (e.g., 0, +x, and −x degrees along x dimension, and 0, +y, −y degrees along y dimension), each acousto-optic device in the AOD 340 is driven by a specific radio frequency signal having a frequency of, e.g., $f_c$, $f_c+f_m$, $f_c-f_m$, for scanning of discrete angles along a corresponding dimension. In one or more embodiments, an angle of light incident to each acousto-optic device in the AOD 340 satisfies a Bragg matching condition. Note that $f_c$ is a frequency of a carrier signal and $f_m$ is a frequency of a modulation signal that modulates the carrier signal for generating the radio frequency signal that drives an acousto-optic device within the AOD 340. The frequency of carrier signal, $f_c$, can be set to be around a center of a frequency bandwidth of the AOD 340 in order to maximize the diffraction efficiency of the diffracted scanning beams 345. In addition, the value of $2f_m$ should be smaller than an acoustic resonant 3 dB frequency bandwidth of each acousto-optic device within the AOD 340. Note also that the frequency bandwidth of the AOD 340 is relatively narrow, providing a relatively narrow angular spread (band) in the Bragg regime for the diffracted scanning beams 345. In alternate embodiments, to achieve fast scanning of a continuum of angles (e.g., with resolution smaller than 0.1 degrees, along both x and y dimensions), each acousto-optic device of the AOD 340 is driven by a frequency sweep signal (e.g., controlled by the controller 315) that performs frequency sweep during a short time duration. For example, the frequency sweep signal may cover frequencies from $f_c-f_m$ to $f_c+f_m$ with a defined frequency resolution of $\Delta f_m$ that is related to a time bandwidth product of an acousto-optic device of the AOD 340.

In some embodiments, a radio frequency driving power of the AOD 340 controlled by the controller 315 can be up to 500 mW, and a driving radio frequency controlled by the controller 315 can be in the range of a few MHz up to GHz. In one embodiment, the AOD 340 is configured as a diffraction grating device having an array of transducers. In an alternate embodiment, the AOD 340 is configured as a diffraction grating device having a single transducer. The AOD 340 represents a dynamic phase grating suitable for achieving both dynamic and high speed scanning, based on a sound wave traveling through a crystal that diffracts the one or more optical beams 330 and creates the diffracted scanning beams 345 as real-time configurable structured light. In some embodiments, the AOD 340 can accept the one or more optical beams 330 having visible to infrared wavelengths. In some embodiments, efficiency of the AOD 340 depends on a bandwidth of each transducer in the AOD 340, which can be designed to maintain efficiency between, e.g., 80% and 90%.

In some embodiments, the one or more optical beams 330 are incident on the AOD 340 at an angle that satisfies the Bragg matching condition. The AOD 340 may directly generate the diffracted scanning beams 345 as polarized light (e.g., circularly polarized light) by orienting the one or more optical beams 330 to a crystal in the AOD 340 in a geometry satisfying the Bragg matching condition. Note that the diffracted scanning beams 345 can be either right handed circularly polarized or left handed circularly polarized based on the crystal in the AOD 340. In some embodiments, a state of polarization (SOP) of the one or more optical beams 330 incident to the AOD 340 matches an eigenstate of polarization at the Bragg angle for achieving maximum diffraction efficiency of the AOD 340. A polarization element can be included in front of the AOD 340 (not shown in FIG. 3A) to maximize the diffraction efficiency of the AOD 340, if the SOP of the one or more optical beams 330 does not match the eigenstate of polarization at the Bragg angle for phase matching condition.

The AOD 340 provides ultrafast scanning speed to dynamically scan arbitrary patterns that can be projected to one or more objects in the local area 320. The AOD 340 operates based on one or more different crystal types, each crystal type having a wide spectral bandwidth and being transparent for light from visible to infrared wavelengths. Hence, the AOD 340 can diffract the one or more optical beams 330 in a wide wavelength range. Depending on a configuration of the NED 100 and/or the HMD 200, the AOD 340 can be implemented as a different type of device. In one embodiment, the AOD 340 is implemented as a bulk device. In another embodiment, the AOD 340 is implemented as a plate device, i.e., a compact version of a bulk device. In yet another embodiment, the AOD 340 is implemented as a thin film device based on a surface propagating acoustic wave deflector. Depending on a type of scanning, the AOD 340 may include a different number of acousto-optic devices or elements. In one embodiment, the AOD 340 includes a single acousto-optic device or element for generating the diffracted scanning beams 345 as one-dimensional scanning beams for one-dimensional random scanning. In an alternate embodiment, the AOD 340 includes at least one pair of acousto-optic devices whose axes of orientation are orthogonal to each other. Accordingly, one acousto-optic device in a pair of acousto-optic devices diffracts light in one dimension (e.g., x) and the second acousto-optic device in the pair diffracts the x-diffracted light along an orthogonal dimension (e.g., y), thereby generating the diffracted scanning beams 345 as two-dimensional scanning beams for two-dimensional random scanning. Each acousto-optic device or element in the AOD 340 can be configured to function as a dynamic diffraction grating that diffracts incident light by a specific diffraction angle based in part on the emission instructions from the controller 315. Additional details regarding structure and operation of an acousto-optic device is described with regard to U.S. application Ser. No. 15/599,353, filed on May 18, 2017, and U.S. application Ser. No. 15/643,912, filed on Jul. 7, 2017, which are incorporated by reference in their entireties.

A liquid crystal device (LCD) 350 is positioned in front of the AOD 340. The LCD 350 is configured to further diffract light received from the AOD 340, based in part on the emission instructions from the controller 315. The LCD 350 diffracts the diffracted scanning beams 345 to generate structured light 355 having an ultra-wide field-of-view for scanning the local area 320. It should be understood that the structured light 355 with the ultra-wide field-of-view can be generated by the DCA 300 having a reverse order of the AOD 340 and the LCD 350 where the AOD 340 is positioned in front of the LCD 350 (the embodiment not shown in FIG. 3A).

The LCD 350 includes a plurality of active liquid crystal gratings (LCGs) in an optical series. Note that an active LCG is in optical series with another active LCG when light diffracted by the active LCG is incident to the other active LCG. Each active LCG in the LCD 350 is configured to further diffract the diffracted scanning beams 345 by a specific diffraction angle, which can be controlled based in part on the emission instructions from the controller 315. In some embodiments, each active LCG can be made based on, e.g., photo-alignment with liquid crystal polymers and a polarization holography setup. In some embodiments, the LCD 350 includes three active LCGs, thus forming with the AOD 340 a series of four active diffraction layers. At any time instant, two diffraction layers out of four diffraction layers may be in an active state (e.g., controlled by the controller 315) and generate the structured light 355 covering an ultra-wide scanning field of the local area 320. In some embodiments, at most two of LCGs in the LCD 350 are in active states providing diffraction of corresponding incident light.

In some embodiments, based on modulation of optical axis, the LCGs in the LCD 350 can be Pancharatnam-Berry phase gratings, polarization volume gratings, or conventional LCGs. In some other embodiments, based on refractive index modulation, the LCGs in the LCD 350 can be conventional LCDs with patterned indium tin oxide (ITO) films or hidden dielectric pattern to generate in-homogenous electric field across a substrate for producing grating effect. In some other embodiments, based on modulation of thickness, the LCGs in the LCD 350 can be implemented using liquid crystal cells with in-homogenous cell gap across a substrate for generating grating effect. In some other embodiments, the LCGs in the LCD 350 can be implemented by filling liquid crystals into substrates having a grating structure on one or both sides of the substrates. In some other embodiments, the LCGs in the LCD 350 can be polarization sensitive or polarization non-sensitive depending on a configuration and polarization state of the illumination source 325.

The LCD 350 may utilize switchable or non-switchable liquid crystal cells, depending on the working principle of LCGs within the LCD 350. In one or more embodiments, the switchable liquid crystal cells function as a switchable half-wave plate. In some embodiments, the light generator 305 of the DCA 300 may include polarization correction elements, depending on the working principle of LCGs in the LCD 350, layer stack configuration of the AOD 340 and/or the LCD 350, and a polarization state of the illumination source 325. A polarization correction element integrated into the DCA 300 may be a linear polarizer, a circular polarizer, a quarter waveplate, a c-plate, or combination thereof.

A projection assembly 360 is positioned in front of the combination of the AOD 340 and the LCD 350. The projection assembly 360 includes one or more optical elements (lenses). Optionally, the projection assembly 360 includes a polarizing element for polarization of the structured light 355. The structured light 355 may be selected from a group consisting of linearly polarized light (vertical and horizontal), right handed circularly polarized light, left handed circularly polarized light, and elliptically polarized light. The projection assembly 360 projects the structured light 355 into the local area 320 over an ultra-wide field-of-view, e.g., of 160 degrees along x dimension and/or y dimension. The structured light 355 illuminates portions of the local area 320, including one or more objects in the local area 320. A reflected structured light 365 is generated based on reflection of the structured light 355 from the one or more objects in the local area 320.

The imaging device 310 captures one or more images of the one or more objects in the local area 320 by capturing the portions of the reflected structured light 365. In one embodiment, the imaging device 310 is an infrared camera configured to capture images in an infrared spectrum. In another embodiment, the imaging device 310 is configured to capture an image light of a visible spectrum. The imaging device 310 can be configured to operate with a frame rate in the range of kHz to MHz for fast detection of objects in the local area 320. In an embodiment, the imaging device 310 includes a polarizing element placed in front of a camera for receiving and propagating the reflected structured light 365 of a particular polarization. The reflected structured light 365 may be selected from a group consisting of linearly polarized light (vertical and horizontal), right handed circularly polarized light, left handed circularly polarized light, and elliptically polarized light. It should be noted that polarization of the reflected structured light 365 can be different than polarization of the structured light 355 that illuminates the local area 320. In some embodiments, the imaging device 310 includes more than one camera.

In some embodiments, the DCA 300 includes a light shutter (not shown in FIG. 3A) coupled to the imaging device 310. The light shutter can operate such that the NED 100 or the HMD 200 switches between an AR mode and a VR mode. In one embodiment, the light shutter is implemented as a mechanical component. In the AR mode, the mechanical light shutter may be open and portions of the reflected structured light 365 propagates to a detector of the imaging device 310. In the VR mode, the mechanical light shutter may be closed to block one or more portions of the reflected structured light 365 from reaching the detector of the imaging device 310. In another embodiment, the light shutter is implemented as a polarizer configured to propagate light of specific polarization, e.g., based on polarization instructions from the controller 315. In the AR mode, the light shutter implemented as a polarizer may be configured to propagate light having the same polarization as one or more portions of the reflected structured light 365. In the VR mode, the light shutter implemented as a polarizer may be configured to block propagation of light having the same polarization as one or more portions of the reflected structured light 365.

The controller 315 is configured to control operations of various components of the DCA 300 in FIG. 3A. In some embodiments, the controller 315 provides emission instructions to the illumination source 325 to control intensity of the one or more optical beams 330, modulation of the one or more optical beams 330, a time duration during which the illumination source 325 is activated, etc. The controller 315 may further create the emission instructions which include a radio frequency at which the AOD 340 is driven. The controller 315 may generate the emission instructions based on, e.g., a predetermined list of values for the radio frequency stored in a look-up table of the controller 315. In an embodiment, the predetermined radio frequencies are stored as waveforms in an electronic chip, e.g., in a direct digital synthesizer (not shown in FIG. 3A) coupled to the controller 315. In another embodiment, the emission instructions are created by a voice control integrated into the controller 315. Upon a verbal request, the voice control of the controller 315 computes a radio frequency for driving the AOD 340 to generate the diffracted scanning beams 345 and the structured light 355 of a specific spatial frequency suitable for detection of stationary object(s) and/or tracking of moving object(s) in the local area 320 at a certain distance from the imaging device 310.

The controller 315 can modify the radio frequency at which the AOD 340 is driven to adjust a diffraction angle at which the one or more optical beams 330 are diffracted. In this way, the controller 315 can instruct the AOD 340 to scan a plurality of diffraction angles at which the one or more optical beams 330 are diffracted and interfered to form the diffracted scanning beams 345 and the structured light 355. A radio frequency at which the AOD 340 is driven may control a separation of the optical beams 330 diffracted by the AOD 340. Hence, a spatial frequency of the resulting diffracted scanning beams 345 (and of the structured light 355) directly depends on the radio frequency at which the AOD 340 is driven.

As shown in FIG. 3A, the controller 315 is further coupled to the imaging device 310 and can be configured to determine depth information for the one or more objects in the local area 320. The controller 315 is configured to determine depth information for the one or more objects based at least in part on the captured one or more images of portions of the reflected structured light 365. In some embodiments, the controller 315 can be configured to determine the depth information based on polarization information of the reflected structured light 365 and polarization information of the structured light 355. For a depth sensing method based on structured light illumination, the controller 315 is configured to determine the depth information based on phase-shifted patterns of the portions of the reflected structured light 365 distorted by shapes of the one or more objects in the local area 320, and to use triangulation calculation to obtain a depth map of the local area 320.

Figure 3B:
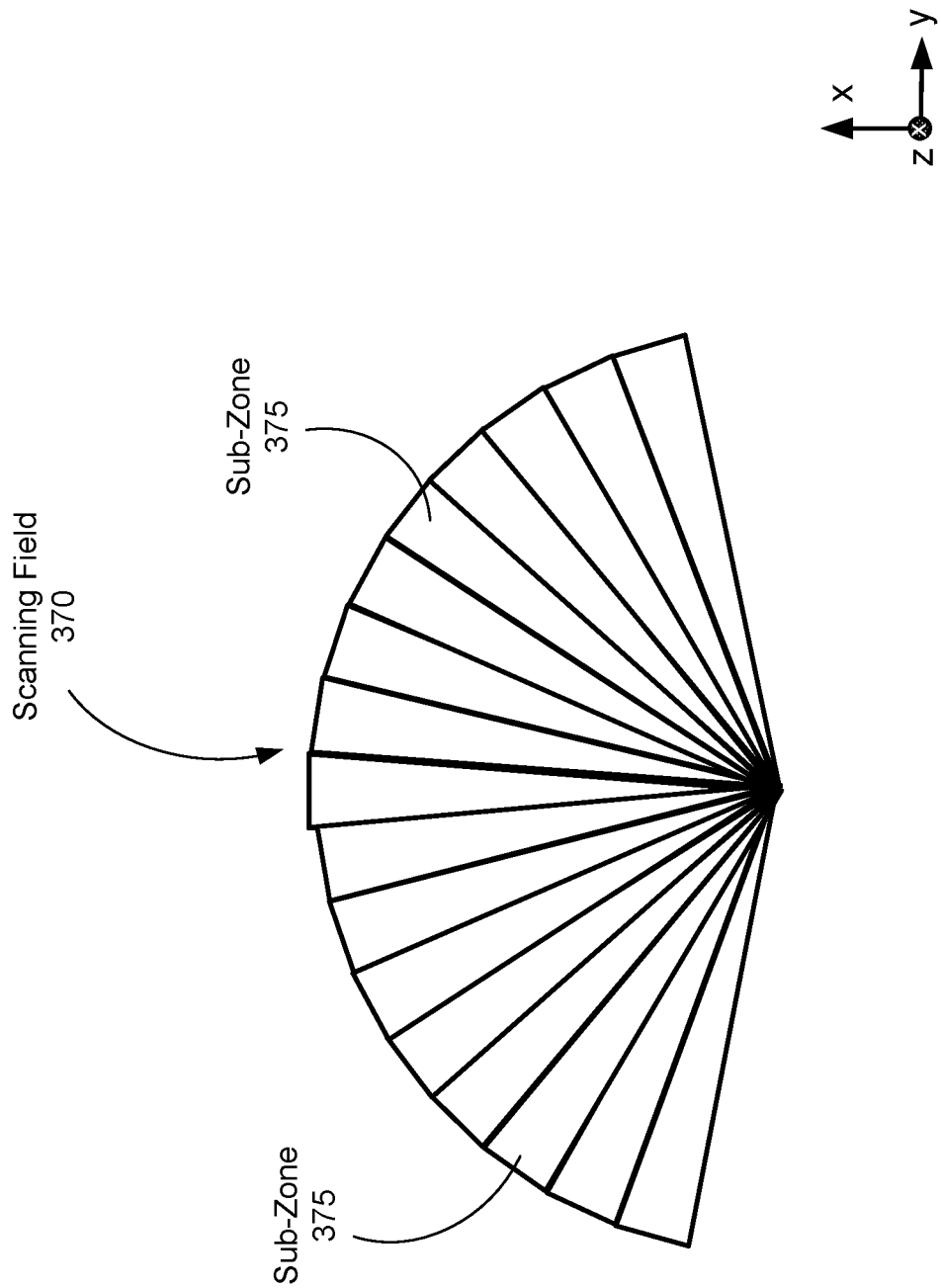
FIG. 3B illustrates a scanning field covered by the DCA in FIG. 3A, in accordance with one or more embodiments.

FIG. 3B illustrates a scanning field 370, which may be covered by the structured light 355 generated by the DCA 300 in FIG. 3A, in accordance with one or more embodiments. As shown in FIG. 3B, the scanning field 370 includes a plurality of sub-zones 375. In the illustrative embodiment shown in FIG. 3B, the scanning field 370 covers a field-of-view of 160 degrees along both x and y axes, whereas each sub-zone 375 covers 10 degrees along y axis. As discussed above in conjunction with FIG. 3A, the controller 315 configures, via the emission instructions, the AOD 340 to scan a plurality of diffraction angles at which the one or more optical beams 330 are diffracted and interfered to form the diffracted scanning beams 345. In the embodiment illustrated in FIG. 3B, the AOD 340 scans diffraction angles between −5 degrees and +5 degrees, e.g., with scanning resolution of 0.1 degrees and scanning speed in the order of MHz. In this way, the AOD 340 is configured to achieve fast and fine-grained scanning within each subzone 375 of the scanning field 370.

As also discussed above in conjunction with FIG. 3A, the controller 315 further configures, via the emission instructions, each active LCG within the LCD 350 to further diffract the diffracted scanning beams 345 by a specific diffraction angle at a particular time instant. In some embodiments, diffraction angles achieved by each active LCG within the LCD 350 are larger than one or more diffraction angles achieved by the AOD 340. In this way, the LCD 350 is configured to generate the structured light 355 that scans the local area 320 from one sub-zone 375 to another (not necessarily adjacent) sub-zone 375 of the scanning field 370, with a scanning speed, e.g., in the order of kHz. Thus, the LCD 350 with the plurality of active LCGs enables scanning with an ultra-wide field-of-view and a large diffraction angle. In some embodiments, a size of the AOD 340 and a size of the LCD 350 are of sub-millimeter order. Power consumption of the AOD 340 and the LCD 350 is, e.g., between 10 mW and 100 mW. An active LCG within the LCD 350 having a large diffraction angle (e.g., of 75 degrees) can achieve high efficiency by using highly birefringent and dual twist or multiple twisted structures.

Figure 3C:
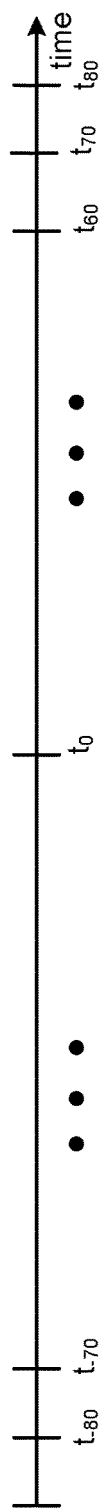
FIG. 3C illustrates different diffraction settings in the DCA in FIG. 3A to cover the scanning field in FIG. 3B, in accordance with one or more embodiments.

FIG. 3C illustrates a table 380 with different diffraction settings of the AOD 340 and the active LCGs within the LCD 350 for covering the scanning field 370 in FIG. 3B having a field-of-view between −80 degrees and +80 degrees, in accordance with one or more embodiments. Note that columns in the table 380 in FIG. 3C correspond to different time instants, e.g., time instants $t_{-80}$, $t_{-70}$, ..., $t_0$, ..., $t_{60}$, $t_{70}$, $t_{80}$, not necessarily in chronological order. In the illustrative embodiment of FIG. 3C, the AOD 340 is configured to diffract the one or more optical beams 330 by a diffraction angle between −5 degrees and +5 degrees, with the resolution of, e.g., 0.1 degree to form the diffracted scanning beams 345 (and the structured light 355) for fast and fine-grained scanning within any sub-zone 375 of the scanning field 370 in FIG. 3B. In the illustrative embodiment of FIG. 3C, the LCD 350 includes three active LCGs, e.g., LCG1, LCG2, LCG3, in optical series; LCG1 provides a fixed diffraction angle of either −15 degrees or +15 degrees; LCG2 provides a fixed diffraction angle of either −35 degrees or +35 degrees; and LCG3 provides a fixed diffraction angle of either −75 degrees or +75 degrees. In this way, the combination of the AOD 340 and the LCD 350 generates the structured light 355 that scans the local area 320 from one sub-zone 375 to another (not necessarily adjacent) sub-zone 375 of the scanning field 370, with a fast scanning speed within each sub-zone 375 and a moderate speed of switching between sub-zones 375.

In some embodiments, the controller 315 of the DCA 300 in FIG. 3A adjusts, based in part on the emission instructions over a plurality of time instants, settings of the AOD 340 and of each active LCG in the LCD 350 to generate the structured light 355 for covering the scanning field 370 in FIG. 3B in the plurality of time instants. As shown, e.g., in the first column of the table 380 in FIG. 3C corresponding to a time instant $t_{-80}$, the controller 315 adjusts the settings of the AOD 340 and of the LCD 350 so that a diffraction angle of the AOD 340 is −5 degrees, LCG1 and LCG2 are in an inactive state, and a diffraction angle of LCG3 is −75 degrees. Thus, at the time instant $t_{-80}$, a total diffraction angle generated by the combination of the AOD 340 and the LCD 350 is −80 degrees. Then, the controller 315 adjusts the settings of the AOD 340 to change, during a plurality of time instants, e.g., with MHz speed and resolution of 0.1 degree, a diffraction angle between −5 degrees and +5 degrees. In the same time, the controller 315 does not adjust the settings of the active LCGs within the LCD 350, i.e., LCG1 and LCG2 are still in the inactive state and a diffraction angle of LCG3 is still −75 degrees. In this way, the structured light 355 generated by the combination of the AOD 340 and the LCD 350 scans one sub-zone 375 of the scanning field 370 in FIG. 3B.

The scanning process can continue by switching from one sub-zone 375 to another (not necessarily adjacent) sub-zone 375 in FIG. 3B in accordance with the settings shown in the table 380 in FIG. 3C until the entire scanning field 370 in FIG. 3B is covered by the structured light 355. At each time instant shown in FIG. 3C, a different sub-zone 375 of the scanning field 370 in FIG. 3B is covered. As shown in FIG. 3C, at each time instant, at most two diffraction layers out of three active LCGs in the LCD 350 are in active states. Because the AOD 340 and the LCGs in the LCD 350 are active components, the AOD 340 and each active LCG in the LCD 350 can be configured to be in active state or in inactive state based on an electrical field, controlled by, e.g., the controller 315.

In the illustrative embodiment of FIG. 3C, the AOD 340 is in active state for scanning small angles and achieving fast and fine-grained scanning within any sub-zone 375 of the scanning field 370 in FIG. 3B. The AOD 340 may be configured to scan continuously over a range from −5 degrees to +5 degrees within the sub-zone 375. Thus, to achieve fast and continuous subzone scanning, the AOD 340 is in active state. In some embodiments, the AOD 340 and the LCD 350 are configured to operate in a discrete scanning mode, where the sub-zone 375 is not scanned by the AOD 340 and at least one LCG in the LCD 350 is in active state. In the discrete scanning mode, the LCD 350 can scan discretely one or more beams of the structured light 355 in large angles (e.g., from −50 degrees to −60 degrees) without scanning within the sub-zone 375. In the discrete scanning mode, the AOD 340 can be deactivated to save power. In the power save mode when the AOD 340 is in inactive state, the zeroth order un-diffracted beam 345 from the AOD 340 is scanned by at least one active LCG of the LCD 350.

Figure 4:
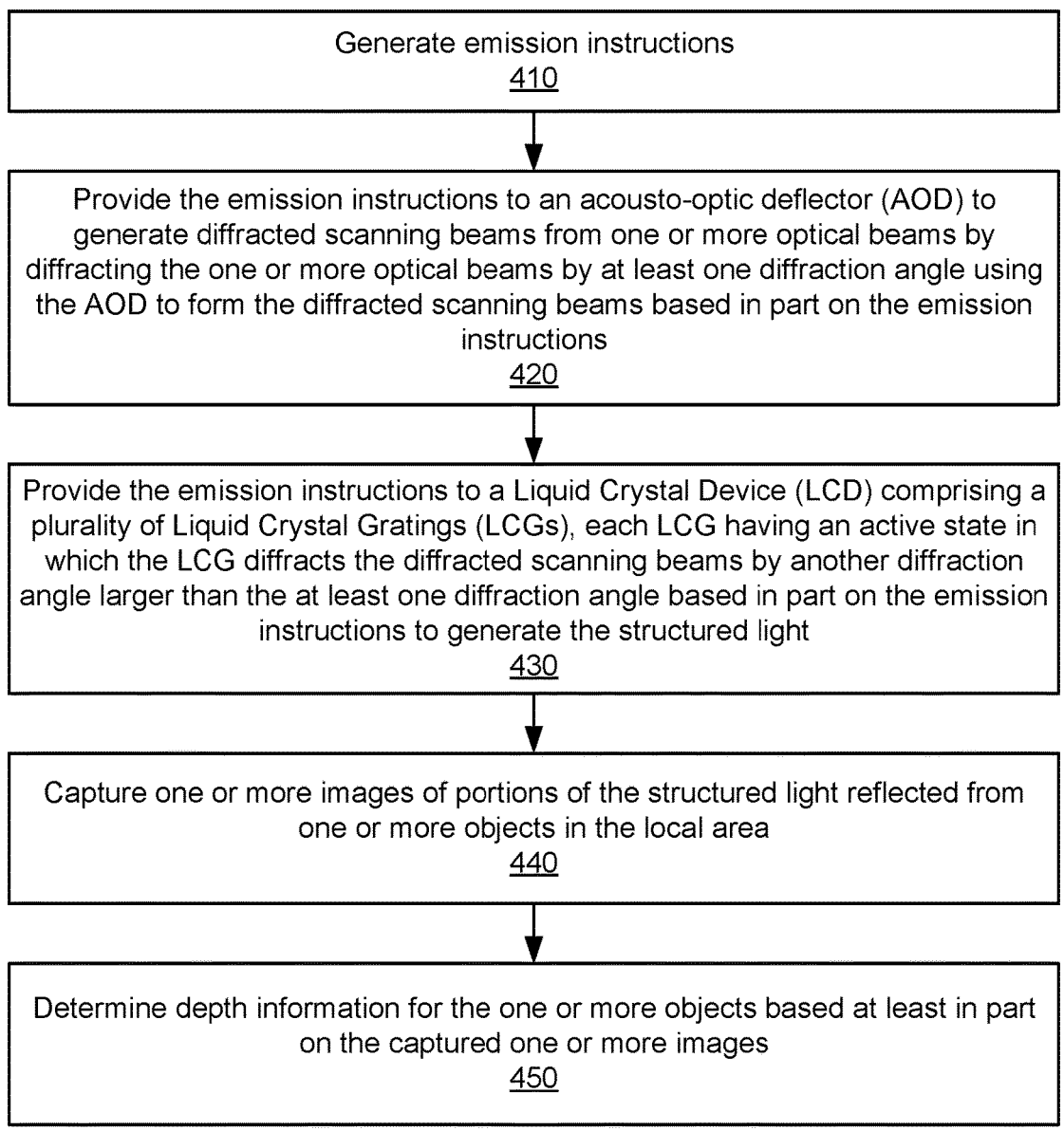
FIG. 4 is a flow chart illustrating a process of determining depth information of objects in a local area based on ultra-wide field-of-view scanning, in accordance with one or more embodiments.

FIG. 4 is a flow chart illustrating a process 400 of determining depth information of objects in a local area based on ultra-wide field-of-view scanning, which may be implemented at the NED 100 shown in FIG. 1A and/or the HMD 200 shown in FIG. 2A, in accordance with one or more embodiments. The process 400 of FIG. 4 may be performed by the components of a DCA (e.g., the DCA 300). Other entities (e.g., a NED, a HMD, and/or console) may perform some or all of the steps of the process in other embodiments. Likewise, embodiments may include different and/or additional steps, or perform the steps in different orders.

The DCA generates 410 (e.g., via a controller) emission instructions. The DCA may provide the emission instructions to an illumination source within the DCA. Based on the emission instructions, the illumination source may emit one or more optical beams. In some embodiments, the DCA generates the emission instructions which include information about at least one radio frequency.

The DCA provides 420 (e.g., via the controller) the emission instructions to an AOD to generate diffracted scanning beams from one or more optical beams by diffracting the one or more optical beams by at least one diffraction angle using the AOD to form the diffracted scanning beams based in part on the emission instructions. Responsive to the at least one radio frequency in the emission instructions, the DCA generates at least one sound wave within the AOD to form at least one dynamic diffraction grating. In some embodiments, the DCA modifies the at least one radio frequency in the emission instructions to adjust a diffraction angle of the at least one diffraction angle at which the one or more optical beams are diffracted in each dimension and interfered to form the diffracted scanning beams.

The DCA provides 430 (e.g., via the controller) the emission instructions to a LCD comprising a plurality of LCGs, each LCG having an active state in which the LCG diffracts the diffracted scanning beams by another diffraction angle larger than the at least one diffraction angle based in part on the emission instructions to generate the structured light. Each LCG is configured to diffract the diffracted scanning beams by a fixed diffraction angle larger than the at least one diffraction angle based in part on the emission instructions to generate the structured light.

The DCA may project (e.g., via a projection assembly) the structured light into a local area. In some embodiments, the DCA projects the structured light to illuminate an ultra-wide field-of-view of the local area for accurate depth scanning. The DCA may also control (e.g., via the controller) a scanning sub-zone of the ultra-wide field-of-view of the local area by controlling dynamic diffraction gratings of the AOD and LCGs within the DCA.

The DCA captures 440 (e.g., via an imaging device) one or more images of portions of the structured light reflected from one or more objects in the local area. In some embodiments, the imaging device of the DCA includes a polarizing element and a camera, wherein the polarizing element is positioned in front of the camera. The polarizing element is configured to receive the portions of the reflected structured light having a specific polarization and to propagate the received portions of reflected polarized light pattern to the camera.

The DCA determines 450 (e.g., via the controller) depth information for the one or more objects based at least in part on the captured one or more images. In some embodiments, the DCA determines 450 the depth information for the one or more objects based in part on polarization information of the captured portions of the reflected structured light.

In some embodiments, the DCA is configured as part of a NED, e.g., the NED 100 in FIG. 1A. In some other embodiments, the DCA is configured as part of a HMD, e.g., the HMD 200 in FIG. 2A. In one or more embodiments, the DCA provides the determined depth information to a console coupled to the NED or the HMD. The console is then configured to generate content for presentation on an electronic display of the NED or the HMD, based on the depth information. In another embodiment, the DCA provides the determined depth information to a module of the NED or the HMD that generates content for presentation on the electronic display of the NED or the HMD, based on the depth information. In an alternate embodiment, the DCA is integrated into a HMD as part of an artificial reality system. In this case, the DCA may be configured to sense and display objects behind a head of a user wearing the HMD or display objects recorded previously.

System Environment

Figure 5:
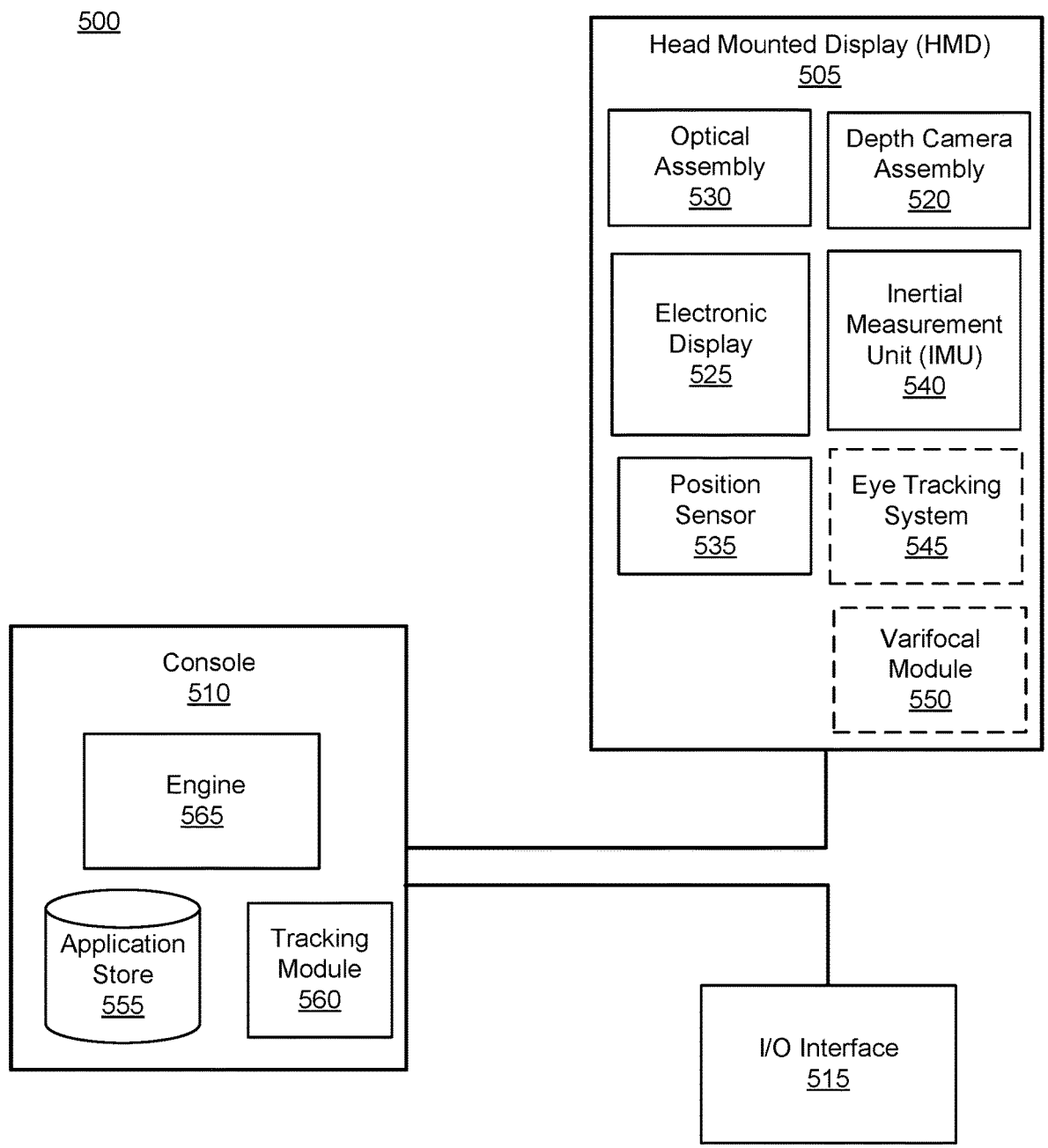
FIG. 5 is a block diagram of an artificial reality system in which a console operates, in accordance with one or more embodiments.

FIG. 5 is a block diagram of one embodiment of an artificial reality system 500 in which a console 510 operates. The artificial reality system 500 may be a NED system or a HMD system. The artificial reality system 500 may operate in an artificial reality system environment. In some embodiments, the artificial reality system 500 shown by FIG. 5 comprises a HMD 505 and an input/output (I/O) interface 515 that is coupled to the console 510. In some other embodiments (not shown in FIG. 5), the artificial reality system 500 includes a NED coupled to the console 510. While FIG. 5 shows an example HMD system 500 including one HMD 505 and on I/O interface 515, in other embodiments any number of these components may be included in the artificial reality system 500. For example, there may be multiple HMDs 505 each having an associated I/O interface 515, with each HMD 505 and I/O interface 515 communicating with the console 510. In alternative configurations, different and/or additional components may be included in the artificial reality system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by the HMD 505.

The HMD 505 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 505, the console 510, or both, and presents audio data based on the audio information. The HMD 505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 505 is the HMD 200 described above in conjunction with FIG. 2A.

The HMD 505 includes a DCA 520, an electronic display 525, an optical assembly 530, one or more position sensors 535, an IMU 540, an optional eye tracking system 545, and an optional varifocal module 550. Some embodiments of the HMD 505 have different components than those described in conjunction with FIG. 5. Additionally, the functionality provided by various components described in conjunction with FIG. 5 may be differently distributed among the components of the HMD 505 in other embodiments.

The DCA 520 captures data describing depth information of an area surrounding some or all of the HMD 505. The DCA 520 can compute the depth information using the data (e.g., based on captured portions of structured light), or the DCA 520 can send this information to another device such as the console 510 that can determine the depth information using the data from the DCA 520.

The DCA 520 includes a light generator, an imaging device and a controller that may be coupled to both the light generator and the imaging device. The light generator of the DCA 520 is configured to illuminate a local area with structured light in accordance with emission instructions from the controller. The light generator comprises an illumination source, an AOD, an LCD, and a projection assembly. The illumination source is configured to emit one or more optical beams. The AOD generates diffracted scanning beams from the one or more beams emitted from the illumination source. The AOD is configured to function as a dynamic diffraction grating that diffracts the one or more optical beams to form the diffracted scanning beams based in part on the emission instructions. The LCD includes a plurality of active LCGs. Each LCG is configured to diffract the diffracted scanning beams based in part on the emission instructions to generate the structured light. The projection assembly is configured to project the structured light into the local area. The imaging device of the DCA 520 is configured to capture one or more images of portions of the structured light reflected from one or more objects in the local area. The controller of the DCA 520 generates the emission instructions and provides the emission instructions to the light generator of the DCA 520. The controller of the DCA 520 is also configured to determine depth information for the one or more objects based at least in part on the captured one or more images of portions of the reflected structured light. The DCA 520 may be an embodiment of the DCA 300 in FIG. 3A.

The electronic display 525 displays 2D or 3D images to the user in accordance with data received from the console 510. In various embodiments, the electronic display 525 comprises a single electronic display or multiple electronic displays (e.g., a display for each eye of a user). Examples of the electronic display 525 include: a liquid crystal display, an OLED display, an ILED display, an AMOLED display, a TOLED display, some other display, or some combination thereof. The electronic display 525 may be an embodiment of the electronic display 245 in FIG. 2B.

The optical assembly 530 magnifies image light received from the electronic display 525, corrects optical errors associated with the image light, and presents the corrected image light to a user of the HMD 505. The optical assembly 530 includes a plurality of optical elements. Example optical elements included in the optical assembly 530 include: an aperture, a Fresnel lens, a convex lens, a concave lens, a filter, a reflecting surface, or any other suitable optical element that affects image light. Moreover, the optical assembly 530 may include combinations of different optical elements. In some embodiments, one or more of the optical elements in the optical assembly 530 may have one or more coatings, such as partially reflective or anti-reflective coatings.

Magnification and focusing of the image light by the optical assembly 530 allows the electronic display 525 to be physically smaller, weigh less and consume less power than larger displays. Additionally, magnification may increase the field-of-view of the content presented by the electronic display 525. For example, the field-of-view of the displayed content is such that the displayed content is presented using almost all (e.g., approximately 110 degrees diagonal), and in some cases all, of the user's field-of-view. Additionally in some embodiments, the amount of magnification may be adjusted by adding or removing optical elements.

In some embodiments, the optical assembly 530 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 525 for display is pre-distorted, and the optical assembly 530 corrects the distortion when it receives image light from the electronic display 525 generated based on the content. The optical assembly 530 may be an embodiment of the optical assembly 250 in FIG. 2B.

The IMU 540 is an electronic device that generates data indicating a position of the HMD 505 based on measurement signals received from one or more of the position sensors 535 and from depth information received from the DCA 520. A position sensor 535 generates one or more measurement signals in response to motion of the HMD 505. Examples of position sensors 535 include: one or more accelerometers, one or more gyroscopes, one or more magnetometers, another suitable type of sensor that detects motion, a type of sensor used for error correction of the IMU 540, or some combination thereof. The position sensors 535 may be located external to the IMU 540, internal to the IMU 540, or some combination thereof.

Based on the one or more measurement signals from one or more position sensors 535, the IMU 540 generates data indicating an estimated current position of the HMD 505 relative to an initial position of the HMD 505. For example, the position sensors 535 include multiple accelerometers to measure translational motion (forward/back, up/down, left/right) and multiple gyroscopes to measure rotational motion (e.g., pitch, yaw, roll). In some embodiments, the IMU 540 rapidly samples the measurement signals and calculates the estimated current position of the HMD 505 from the sampled data. For example, the IMU 540 integrates the measurement signals received from the accelerometers over time to estimate a velocity vector and integrates the velocity vector over time to determine an estimated current position of a reference point on the HMD 505. Alternatively, the IMU 540 provides the sampled measurement signals to the console 510, which interprets the data to reduce error. The reference point is a point that may be used to describe the position of the HMD 505. The reference point may generally be defined as a point in space or a position related to the HMD's 505 orientation and position.

The IMU 540 receives one or more parameters from the console 510. The one or more parameters are used to maintain tracking of the HMD 505. Based on a received parameter, the IMU 540 may adjust one or more IMU parameters (e.g., sample rate). In some embodiments, certain parameters cause the IMU 540 to update an initial position of the reference point so it corresponds to a next position of the reference point. Updating the initial position of the reference point as the next calibrated position of the reference point helps reduce accumulated error associated with the current position estimated the IMU 540. The accumulated error, also referred to as drift error, causes the estimated position of the reference point to "drift" away from the actual position of the reference point over time. In some embodiments of the HMD 505, the IMU 540 may be a dedicated hardware component. In other embodiments, the IMU 540 may be a software component implemented in one or more processors. The IMU 540 may be an embodiment of the IMU 230 in FIG. 2A.

In some embodiments, the eye tracking system 545 is integrated into the HMD 505. The eye tracking system 545 determines eye tracking information associated with an eye of a user wearing the HMD 505. The eye tracking information determined by the eye tracking system 545 may comprise information about an orientation of the user's eye, i.e., information about an angle of an eye-gaze. In some embodiments, the eye tracking system 545 is integrated into the optical assembly 530. An embodiment of the eye-tracking system 545 may comprise an illumination source and an imaging device (camera).

In some embodiments, the varifocal module 550 is further integrated into the HMD 505. The varifocal module 550 may be coupled to the eye tracking system 545 to obtain eye tracking information determined by the eye tracking system 545. The varifocal module 550 may be configured to adjust focus of one or more images displayed on the electronic display 525, based on the determined eye tracking information obtained from the eye tracking system 545. In this way, the varifocal module 550 can mitigate vergence-accommodation conflict in relation to image light. The varifocal module 550 can be interfaced (e.g., either mechanically or electrically) with at least one of the electronic display 525 and at least one optical element of the optical assembly 530. Then, the varifocal module 550 may be configured to adjust focus of the one or more images displayed on the electronic display 525 by adjusting position of at least one of the electronic display 525 and the at least one optical element of the optical assembly 530, based on the determined eye tracking information obtained from the eye tracking system 545. By adjusting the position, the varifocal module 550 varies focus of image light output from the electronic display 525 towards the user's eye. The varifocal module 550 may be also configured to adjust resolution of the images displayed on the electronic display 525 by performing foveated rendering of the displayed images, based at least in part on the determined eye tracking information obtained from the eye tracking system 545. In this case, the varifocal module 550 provides appropriate image signals to the electronic display 525. The varifocal module 550 provides image signals with a maximum pixel density for the electronic display 525 only in a foveal region of the user's eye-gaze, while providing image signals with lower pixel densities in other regions of the electronic display 525. In one embodiment, the varifocal module 550 may utilize the depth information obtained by the DCA 520 to, e.g., generate content for presentation on the electronic display 525.

The I/O interface 515 is a device that allows a user to send action requests and receive responses from the console 510. An action request is a request to perform a particular action. For example, an action request may be an instruction to start or end capture of image or video data or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 515 includes an IMU 540 that captures calibration data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the HMD 505 for processing in accordance with information received from one or more of: the DCA 520, the HMD 505, and the I/O interface 515. In the example shown in FIG. 5, the console 510 includes an application store 555, a tracking module 560, and an engine 565. Some embodiments of the console 510 have different modules or components than those described in conjunction with FIG. 5. Similarly, the functions further described below may be distributed among components of the console 510 in a different manner than described in conjunction with FIG. 5.

The application store 555 stores one or more applications for execution by the console 510. An application is a group of instructions, that when executed by a processor, generates content for presentation to the user. Content generated by an application may be in response to inputs received from the user via movement of the HMD 505 or the I/O interface 515. Examples of applications include: gaming applications, conferencing applications, video playback applications, or other suitable applications.

The tracking module 560 calibrates the HMD system 500 using one or more calibration parameters and may adjust one or more calibration parameters to reduce error in determination of the position of the HMD 505 or of the I/O interface 515. For example, the tracking module 560 communicates a calibration parameter to the DCA 520 to adjust the focus of the DCA 520 to more accurately determine positions of structured light elements captured by the DCA 520. Calibration performed by the tracking module 560 also accounts for information received from the IMU 540 in the HMD 505 and/or an IMU 540 included in the I/O interface 515. Additionally, if tracking of the HMD 505 is lost (e.g., the DCA 520 loses line of sight of at least a threshold number of structured light elements), the tracking module 560 may re-calibrate some or all of the HMD system 500.

The tracking module 560 tracks movements of the HMD 505 or of the I/O interface 515 using information from the DCA 520, the one or more position sensors 535, the IMU 540 or some combination thereof. For example, the tracking module 550 determines a position of a reference point of the HMD 505 in a mapping of a local area based on information from the HMD 505. The tracking module 560 may also determine positions of the reference point of the HMD 505 or a reference point of the I/O interface 515 using data indicating a position of the HMD 505 from the IMU 540 or using data indicating a position of the I/O interface 515 from an IMU 540 included in the I/O interface 515, respectively. Additionally, in some embodiments, the tracking module 560 may use portions of data indicating a position or the HMD 505 from the IMU 540 as well as representations of the local area from the DCA 520 to predict a future location of the HMD 505. The tracking module 560 provides the estimated or predicted future position of the HMD 505 or the I/O interface 515 to the engine 555.

The engine 565 generates a 3D mapping of the area surrounding some or all of the HMD 505 (i.e., the "local area") based on information received from the HMD 505. In some embodiments, the engine 565 determines depth information for the 3D mapping of the local area based on information received from the DCA 520 that is relevant for techniques used in computing depth. The engine 565 may calculate depth information using one or more techniques in computing depth from one or more polarized structured light patterns. In various embodiments, the engine 565 uses the depth information to, e.g., update a model of the local area, and generate content based in part on the updated model.

The engine 565 also executes applications within the HMD system 500 and receives position information, acceleration information, velocity information, predicted future positions, or some combination thereof, of the HMD 505 from the tracking module 560. Based on the received information, the engine 565 determines content to provide to the HMD 505 for presentation to the user. For example, if the received information indicates that the user has looked to the left, the engine 565 generates content for the HMD 505 that mirrors the user's movement in a virtual environment or in an environment augmenting the local area with additional content. Additionally, the engine 565 performs an action within an application executing on the console 510 in response to an action request received from the I/O interface 515 and provides feedback to the user that the action was performed. The provided feedback may be visual or audible feedback via the HMD 505 or haptic feedback via the I/O interface 515.

In some embodiments, based on the eye tracking information (e.g., orientation of the user's eye) received from the eye tracking system 545, the engine 565 determines resolution of the content provided to the HMD 505 for presentation to the user on the electronic display 525. The engine 565 provides the content to the HMD 605 having a maximum pixel resolution on the electronic display 525 in a foveal region of the user's gaze, whereas the engine 565 provides a lower pixel resolution in other regions of the electronic display 525, thus achieving less power consumption at the HMD 505 and saving computing cycles of the console 510 without compromising a visual experience of the user. In some embodiments, the engine 565 can further use the eye tracking information to adjust where objects are displayed on the electronic display 525 to prevent vergence-accommodation conflict.

ADDITIONAL CONFIGURATION INFORMATION

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
an illumination source configured to emit one or more optical beams;
an acousto-optic deflector (AOD) that diffracts the one or more optical beams by at least one first diffraction angle to form diffracted scanning beams and adjusts the at least one first diffraction angle over a time period;
a liquid crystal device (LCD) in an optical series with the AOD, the LCD configured to diffract the diffracted scanning beams from the AOD by at least one second diffraction angle larger than the at least one first diffraction angle to generate structured light projected into a local area, the structured light covering a scanning field of the local area over the time period by scanning each sub-zone of the scanning field at a corresponding time instant of the time period based on the adjustment of the at least one first diffraction angle and the diffraction by the at least one second diffraction angle; and
an imaging device configured to capture one or more images of at least a portion of the structured light reflected in the local area.

2. The DCA of claim 1, wherein the AOD includes at least one transducer and at least one diffraction area, and responsive to at least one radio frequency, the at least one transducer is configured to generate at least one sound wave in the at least one diffraction area to form at least one dynamic diffraction grating.

3. The DCA of claim 2, further comprising:
a controller configured to modify the at least one radio frequency to adjust the at least one first diffraction angle at which the one or more optical beams are diffracted to form the diffracted scanning beams.

4. The DCA of claim 1, further comprising:
a controller configured to determine depth information for the local area based at least in part on the captured one or more images.

5. The DCA of claim 1, wherein:
the AOD comprises a pair of AOD plates having mutually orthogonal orientations of crystals in transducers, the pair of AOD plates generates the diffracted scanning beams in two dimensions, and
each AOD plate is configured to diffract incident light by one diffraction angle of the at least one first diffraction angle along one dimension.

6. The DCA of claim 1, further comprising:
a controller configured to instruct the AOD to scan the local area at a set of diffraction angles over the time period.

7. The DCA of claim 1, wherein the LCD comprises a plurality of liquid crystal gratings (LCGs), each LCG having an active state in which the LCG is configured to diffract the diffracted scanning beams from the AOD to generate the structured light.

8. The DCA of claim 7, further comprising:
a controller configured to control at most two of the LCGs to be in active states during the time period, wherein each LCG when in the active state is configured to diffract incident light by a fixed diffraction angle over at least a portion of the time period.

9. The DCA of claim 1, wherein the imaging device includes:
a camera; and
a polarizing element positioned in front of the camera, the polarizing element configured to propagate the portions of the reflected structured light having a polarization orthogonal to a polarization of the structured light.

10. The DCA of claim 9, further comprising:
a controller configured to determine depth information for the local area based in part on the polarization of the reflected structured light.

11. A method comprising:
generating emission instructions;
providing the emission instructions to an acousto-optic deflector (AOD) to generate diffracted scanning beams from one or more optical beams by diffracting the one or more optical beams from the AOD by at least one first diffraction angle and by adjusting the at least one first diffraction angle over a time period based in part on the emission instructions to form the diffracted scanning beams;
providing the emission instructions to a liquid crystal device (LCD) in an optical series with the AOD to generate structured light projected into a local area by diffracting the diffracted scanning beams by at least one second diffraction angle larger than the at least one first diffraction angle based in part on the emission instructions, the structured light covering a scanning field of the local area over the time period by scanning each sub-zone of the scanning field at a corresponding time instant of the time period based on the adjustment of the at least one first diffraction angle and the diffraction by the at least one second diffraction angle; and
capturing one or more images of at least a portion of the structured light reflected in the local area.

12. The method of claim 11, further comprising:
creating the emission instructions comprising at least one radio frequency at which the AOD is driven;
providing the emission instructions comprising the at least one radio frequency to the AOD having at least one transducer and at least one diffraction area; and
generating, by the at least one transducer responsive to the at least one radio frequency in the emission instructions, at least one sound wave in the at least one diffraction area to form at least one dynamic diffraction grating that diffracts the one or more optical beams by the at least one first diffraction angle.

13. The method of claim 12, further comprising:
modifying the at least one radio frequency to adjust the at least one first diffraction angle at which the one or more optical beams are diffracted to form the diffracted scanning beams.

14. The method of claim 11, further comprising:
determining depth information for the local area based at least in part on the captured one or more images.

15. The method of claim 11, wherein the LCD comprises a plurality of liquid crystal gratings (LCGs), each LCG having an active state in which the LCG is configured to diffract the diffracted scanning beams from the AOD to generate the structured light.

16. The method of claim 15, further comprising:
controlling at most two of the LCGs to be in active states during the time period based in part on the emission instructions, each LCG when in the active state diffracting incident light by a fixed diffraction angle over at least a portion of the time period.

17. The method of claim 11, further comprising:
controlling the AOD to scan the local area at a set of diffraction angles over the time period, based in part on the emission instructions.

18. The method of claim 11, further comprising:
propagating the portion of the reflected structured light having a polarization orthogonal to a polarization of the structured light; and
determining depth information for the local area based in part on the polarization of the reflected structured light.

19. A structured light generator comprising:
an illumination source configured to emit one or more optical beams;
an acousto-optic deflector (AOD) that diffracts the one or more optical beams by at least one first diffraction angle to form diffracted scanning beams and adjusts the at least one first diffraction angle over a time period; and
a liquid crystal device (LCD) in an optical series with the AOD, the LCD configured to diffract the diffracted scanning beams from the AOD by at least one second diffraction angle larger than the at least one first diffraction angle to generate structured light projected into a local area, the structured light covering a scanning field of the local area over the time period by scanning each sub-zone of the scanning field at a corresponding time instant of the time period based on the adjustment of the at least one first diffraction angle and the diffraction by the at least one second diffraction angle.

20. The structured light generator of claim 19, wherein the AOD includes at least one transducer and at least one diffraction area, and responsive to at least one radio frequency, the at least one transducer is configured to generate at least one sound wave in the at least one diffraction area to form at least one dynamic diffraction grating.

* * * * *